US012168469B2

(12) United States Patent
Moldaschel et al.

(10) Patent No.: US 12,168,469 B2
(45) Date of Patent: Dec. 17, 2024

(54) RECREATIONAL VEHICLE SPINDLE

(71) Applicant: Arctic Cat Inc., Thief River Falls, MN (US)

(72) Inventors: Marcus Charles Moldaschel, Thief River Falls, MN (US); Benjamin Taylor Langaas, Thief River Falls, MN (US); Nathan Lee Blomker, Thief River Falls, MN (US); Steven Janzow, Thief River Falls, MN (US); Guy L. Sibilleau, Roseau, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 93 days.

(21) Appl. No.: 17/982,748

(22) Filed: Nov. 8, 2022

(65) Prior Publication Data

US 2023/0257014 A1  Aug. 17, 2023

Related U.S. Application Data

(60) Provisional application No. 63/423,288, filed on Nov. 7, 2022, provisional application No. 63/404,856, filed on Sep. 8, 2022, provisional application No. 63/310,254, filed on Feb. 15, 2022.

(51) Int. Cl.
*B62B 13/10* (2006.01)
*B62B 17/04* (2006.01)
(52) U.S. Cl.
CPC .............. *B62B 13/10* (2013.01); *B62B 17/04* (2013.01)

(58) Field of Classification Search
CPC .......... B62B 13/06; B62B 13/08; B62B 13/10
See application file for complete search history.

(56) References Cited

U.S. PATENT DOCUMENTS

| | | | |
|---|---|---|---|
| 2,863,952 A | 12/1958 | John et al. |
| 3,963,083 A | 6/1976 | Reese |
| 5,322,317 A | 6/1994 | Kusaka et al. |
| 5,829,768 A | 11/1998 | Kaneko et al. |
| 6,561,302 B2 | 5/2003 | Karpik |
| 6,860,352 B2 | 3/2005 | Mallette et al. |
| 6,942,050 B1 | 9/2005 | Honkala et al. |
| 6,955,237 B1 | 10/2005 | Przekwas et al. |

(Continued)

FOREIGN PATENT DOCUMENTS

| | | |
|---|---|---|
| CA | 2456088 C | 3/2005 |
| CA | 2411964 C | 7/2005 |

(Continued)

OTHER PUBLICATIONS

"2024 Artic Cat ZR 600 R-XC", 2024 Artic Cat ZR 600 R-XC, Jan. 27, 2023, Youtube [online], [Site Visit Jul. 10, 2023], URL: https://www.youtube.com/watch?v=SGtXchHoDA0&t=4s (Year: 2023), Jan. 27, 2023.

(Continued)

*Primary Examiner* — Brian L Swenson
(74) *Attorney, Agent, or Firm* — Billion & Armitage

(57) ABSTRACT

Embodiments of the present disclosure describe a spindle for a recreational vehicle, such as a snowmobile, an all-terrain vehicle (ATV), or a side-by-side vehicle. The spindle includes a spine, optionally a front fin that extends from a front surface of the spine, and optionally a rear fin that extends from a back surface of the spine.

23 Claims, 36 Drawing Sheets

(56) References Cited

U.S. PATENT DOCUMENTS

| | | | |
|---|---|---|---|
| 6,976,550 | B2 | 12/2005 | Vaisanen |
| 7,198,126 | B2 | 4/2007 | Vaisanen |
| 7,249,647 | B2 | 7/2007 | Nietlispach |
| D553,060 | S | 10/2007 | Caiazzo |
| 7,410,182 | B1 | 8/2008 | Giese |
| 8,037,961 | B2 | 10/2011 | Fecteau |
| 8,657,054 | B2 | 2/2014 | Mallette et al. |
| 8,733,773 | B2 | 5/2014 | Sampson |
| 8,919,477 | B2 | 12/2014 | Conn et al. |
| 8,944,204 | B2 | 2/2015 | Ripley et al. |
| 9,090,313 | B2 | 7/2015 | Bedard |
| 9,096,289 | B2 | 8/2015 | Hedlund et al. |
| 9,139,255 | B1 | 9/2015 | Glissmeyer et al. |
| 9,352,802 | B2 | 5/2016 | Sampson |
| 9,428,232 | B2 | 8/2016 | Ripley et al. |
| 9,610,986 | B2 | 4/2017 | Conn |
| D785,513 | S | 5/2017 | Park et al. |
| 9,751,552 | B2 | 9/2017 | Mangum et al. |
| 9,796,437 | B2 | 10/2017 | Wilson et al. |
| 9,873,485 | B2 | 1/2018 | Mangum et al. |
| 9,988,067 | B1 | 6/2018 | Mangum et al. |
| D821,931 | S | 7/2018 | Winter et al. |
| 10,202,169 | B2 | 2/2019 | Mangum et al. |
| 10,232,910 | B2 | 3/2019 | Mangum et al. |
| D845,842 | S | 4/2019 | Sun |
| D864,798 | S | 10/2019 | Sun |
| D865,079 | S | 10/2019 | Ewing |
| 10,538,262 | B2 | 1/2020 | Mangum et al. |
| 10,549,817 | B2 | 2/2020 | Bernier |
| 10,647,384 | B2 | 5/2020 | Vigen et al. |
| D887,310 | S | 6/2020 | Mcginley et al. |
| 10,773,774 | B2 | 9/2020 | Mangum et al. |
| 10,899,415 | B2 | 1/2021 | Mangum et al. |
| 10,960,914 | B2 | 3/2021 | Mangum et al. |
| 11,021,187 | B2 | 6/2021 | Johnson et al. |
| 11,027,794 | B2 | 6/2021 | Vigen |
| D947,957 | S | 4/2022 | Ewing et al. |
| D951,149 | S | 5/2022 | Ewing |
| D960,255 | S | 8/2022 | Ewing et al. |
| 11,505,263 | B2 | 11/2022 | Hedlund et al. |
| 2005/0072613 | A1* | 4/2005 | Maltais .......... B62M 27/02 180/182 |
| 2005/0200094 | A1 | 9/2005 | Hozumi |
| 2005/0200096 | A1 | 9/2005 | Izquierdo et al. |
| 2008/0173491 | A1* | 7/2008 | Fecteau .......... B62M 27/02 180/190 |
| 2011/0115180 | A1* | 5/2011 | Polakowski ...... B62M 27/02 280/124.164 |
| 2013/0032420 | A1* | 2/2013 | Mills .............. B62M 27/02 180/186 |
| 2013/0175106 | A1 | 7/2013 | Bédard et al. |
| 2013/0206494 | A1 | 8/2013 | Hedlund et al. |
| 2014/0361507 | A1 | 12/2014 | Park et al. |
| 2015/0197313 | A1 | 7/2015 | Vistad et al. |
| 2015/0360722 | A1 | 12/2015 | Butlin et al. |
| 2016/0159392 | A1 | 6/2016 | Hoffmann |
| 2017/0050485 | A1 | 2/2017 | Eleazar |
| 2017/0129526 | A1 | 5/2017 | Mangum et al. |
| 2017/0274932 | A1 | 9/2017 | Byrnes |
| 2018/0086377 | A1 | 3/2018 | Kleemann et al. |
| 2018/0111435 | A1 | 4/2018 | Bosch et al. |
| 2019/0256170 | A1 | 8/2019 | Labbe |
| 2020/0324599 | A1 | 10/2020 | Frenzel et al. |
| 2021/0053652 | A1 | 2/2021 | Fuchs et al. |
| 2021/0053653 | A1 | 2/2021 | Mangum et al. |
| 2021/0129943 | A1 | 5/2021 | Mangum et al. |
| 2021/0206225 | A1 | 7/2021 | Casali |
| 2021/0229731 | A1 | 7/2021 | Stoxen et al. |
| 2021/0245837 | A1 | 8/2021 | Vigen |
| 2023/0049333 | A1 | 2/2023 | Prusak et al. |
| 2023/0052282 | A1 | 2/2023 | Hedlund et al. |
| 2023/0256784 | A1 | 8/2023 | Crosby et al. |

FOREIGN PATENT DOCUMENTS

| | | |
|---|---|---|
| CA | 2371477 C | 7/2006 |
| CA | 2363856 C | 1/2008 |
| CA | 2639857 A1 | 6/2009 |
| CA | 2877554 A1 | 1/2014 |
| CA | 2987534 A1 | 12/2016 |
| CA | 2925800 A1 | 10/2017 |
| CA | 2925822 A1 | 10/2017 |
| CA | 3117886 A1 | 5/2020 |
| CA | 3030691 C | 10/2020 |
| CA | 3103308 A1 | 6/2021 |
| CN | 105422273 A | 3/2016 |
| JP | S55125312 A | 9/1980 |
| JP | H10217921 A | 8/1998 |
| JP | 2005193788 A | 7/2005 |
| JP | 4840406 B2 | 12/2011 |
| WO | 8607423 A1 | 12/1986 |
| WO | 2009114414 A1 | 9/2009 |

OTHER PUBLICATIONS

"Arctic Cat Catalyst Design Spindle and Shocks", https://sleddermag.com/arctic-cat-catalyst-design-insight-engineering/arctic-cat-catalyst-design-spindle-and-shocks/ (Year: 2022), Dec. 12, 2022.

"Arctic Cat Highmark Spindles", https://www.backwoodsbmp.com/product-page/arctic-cat-highmark-spindles-pre-order (Year: 2023), Sep. 19, 2023.

"Arctic Cat LH Spindle-Dyn Gry-Fabr", Country Cat—https://www.countrycat.com/arctic-cat-4703-113-spindle-lh-dyn-gry-fabr?utm_source=google&utm_medium=cpc&utm_campaign=google-simple&gclid=EAlalQobChMluZy_-57GgAMViqNaBR2YIAIVEAQYBSABEgKFZfD_BWE.

"Arctic Cat RH Spindle-Med Grn-Fabr", https://www.countrycat.com/arctic-cat-3703-706-spindle-rh-med-grn-fabr?utm_source=google&utm_medium=cpc&utm_campaign=google-simple&gclid=EAlalQobChMluZy_-57GgAMViqNaBR2YIAI VEAQYCyABEglUgPD_BwE.

"Arctic Cat RH Spindle-Med GRN-Fabr", https://www.countrycat.com/arctic-cat-3703-724-spindle-rh-med-grn-fabr?utm_source=google&utm_medium=cpc&utm_campaign=google-simple&gclid=EAlalQobChMluZy_-57GgAMViqNaBR2YIAIVEAQYAyABEgLlufD_BwE.

"Artic Cat Snowmobile", Artic Cat Snowmobile, Dec. 7, 2022, SnowGoer Webpage [online], [Site Visit Jul. 10, 2023], URL: https://snowgoer.com/snowmobiles/arctic-cat-releases-more-catalyst-snowmobile-details/31174/ (Year: 2022).

"Artic Cat ZR 600 R-XC", Artic Cat Webpage [online], [Site Visit Jul. 10, 2023], URL: https://arcticcat.txtsv.com/snowmobile/trail-utility/zr-rxc (Year: 2023).

"Deep Snow Lightweight Ski Spindle Kit", https://ski-doo-shop.brp.com/US/en/860201976-deep-snow-lightweight-ski-spindle-kit.html.

"Front Suspension Kit—(36")", https://ski-doo-shop.brp.com/us/en/860201153-front-suspension-kit-36.html.

"Inside Look_ 2024 Arctic Cat Snowmobiles (Catalyst) Suspensions", https://www.arcticinsider.com/inside-look-2024-arctic-cat-snowmobiles-catalyst-suspensions/ (Year: 2023), Mar. 1, 2023.

"Snowmobile", 2020 M 8000 Mountain Cat Alpha One ES 165 Silver International Ne [S2020M8HA1NES], Ski and Spindle Assembly.

"Snowmobile", 2020 ZR 8000 SNO PRO ES 137 Green [S2020ZXHSPUSG] Ski and Spindle Assembly [108049], https://www.countrycat.com/arctic-cat-parts#/Arctic_Cat/2020_ZR_8000_SNO_PRO_ES_137_GREEN_%5bS2020ZXHSPUSG%5d/SKI_AND_SPINDLE_ASSEMBLY_%5b108049%5d/S2020ZXHSPUSG/108049/y.

* cited by examiner

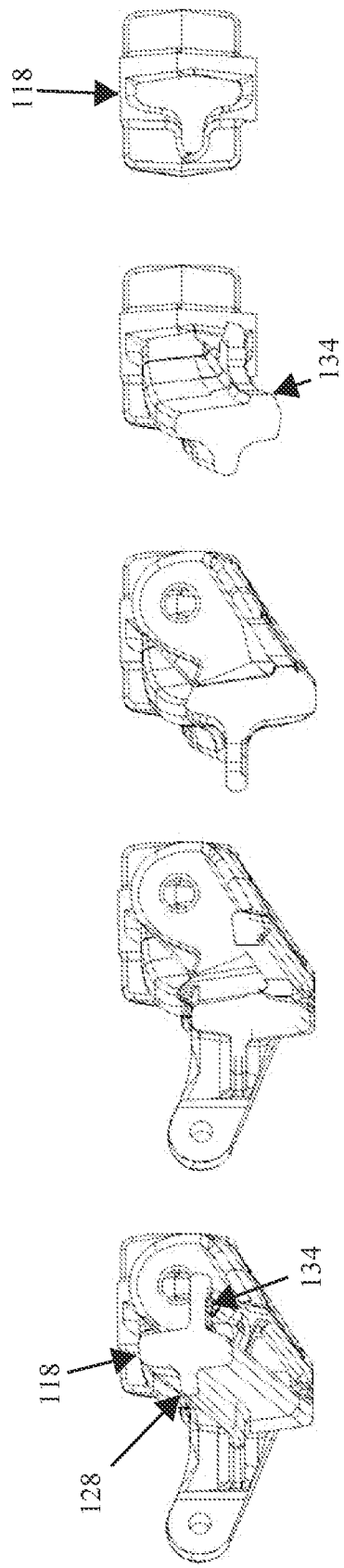

RECREATIONAL VEHICLE SPINDLE

CROSS REFERENCE TO RELATED APPLICATIONS

This application claims the benefit of and priority to U.S. Provisional Application No. 63/310,254, filed Feb. 15, 2022, U.S. Provisional Application No. 63/404,856, filed Sep. 8, 2022, and U.S. Provisional Application No. 63/423,288, filed Nov. 7, 2022. A claim of priority is made to the aforementioned applications. The disclosures of the above applications are incorporated herein by reference in their entirety.

BACKGROUND

Snowmobiles are popular land vehicles used as transportation vehicles or as recreational vehicles in cold and snowy conditions. All-terrain vehicles (ATVs), side-by-side vehicles (SxS or UTVs), and other four-wheeled vehicles are utilized in both on- and off-road recreational and productive activities.

In general, a snowmobile has a chassis on or around which the various components of the snowmobile are assembled. Typical snowmobiles include skis for steering a seat, handlebars, and a track mounted to a chassis. The skis serve to facilitate steering as well as to provide flotation of the front of the snowmobile over the snow in which it is operated. The skis may be pivoted to steer the snowmobile, for example, by turning the handlebars. The skis support the front of the snowmobile using a suspension system that may include suspension or connecting arms mounted to the snowmobile chassis that attach to and support a spindle. Each spindle may be attached to a ski to form the operative link in the steering system whereby movement of the handlebars causes rotation of the spindles, which causes the skis to turn.

Additionally, four-wheelers such as ATVs and UTVs can utilize one or more spindles. Although this disclosure generally discusses snowmobiles, methods and structures discussed herein in the context of snowmobiles may also be used with four-wheelers having wheels or tires, as opposed to skis.

SUMMARY

In some embodiments, a spindle has a body that includes a spine, a front fin extending from a front surface of the spine, and a rear fin extending from a back surface of the spine. The front and rear fins comprise a plurality of windows.

Embodiments further include a spindle with a body comprising a spine, a front fin, and a rear fin, wherein the spine, front fin, and rear fin are arranged so that the body has a generally plus sign (+) shape.

Embodiments include a spindle with an outboard edge, an inboard edge, a leading edge, a trailing edge, a spine forming the outboard and inboard edges; a front fin extending from a front surface of the spine to form at least a portion of the leading edge, the front fin comprising at least one window, and a rear fin extending from a rear surface of the spine to form at least a portion of the trailing edge, the rear fin comprising at least one window; wherein the outboard edge, the inboard edge, the leading edge, and the trailing edge are curvilinear.

Embodiments include a spindle that includes a top mount; a bottom mount; and a spindle body. The spindle body includes a curvilinear spine; a front fin extending from a front surface of the spine and defining a window; and a rear fin extending from a back surface of the spine and defining a window. The spindle body is generally shaped as a plus sign (+) near the top mount and generally shaped as a T near the bottom mount.

Embodiments further include a spindle that includes an upper control arm mount, a base defining an opening for operably connecting the spindle to a ski, the opening including an axis of rotation; a lower control arm mount, and a body extending between the upper control arm mount and the base. The body includes a forward face that defines a first concave portion along the body between the upper control arm mount and the lower control arm mount, and a second concave portion along the body between the lower control arm mount and the base; and a rearward face that defines a third concave portion positioned along the body between the first concave portion and the second concave portion.

Other embodiments include a spindle that include an upper control arm mount, a base defining an opening for operably connecting the spindle to a ski, the opening including an axis of rotation; a lower control arm mount; a body extending between the upper control arm mount and the base, the body comprising a forward face and a rearward face; and a front fin extending forward from the forward face, the fin defining a first concave portion along the body between the upper control arm mount and the lower control arm mount, and a second concave portion along the body between the lower control arm mount and the base.

Embodiments include a spindle that comprises an upper control arm mount; a base defining an opening for operably connecting the spindle to a ski, the opening including an axis of rotation; a lower control arm mount; a body extending between the upper control arm mount and the base, the body comprising a forward face and a rearward face; and a rear fin extending rearward from the rearward face, the rear fin extends along the length of the body from the upper control arm mount to the base.

Embodiments further include a snowmobile that includes a standalone forward frame, a spindle including a top and a bottom, wherein the bottom is securable to a ski; an upper control arm secured to the top of the spindle and the frame; a lower control arm secured to the spindle and the frame, and a steering column. The frame includes a front; a rear; and a forward frame member including a first end positioned between the front and the rear, and a second end extending upwardly are rearwardly to a steering column mount. The steering column has a length extending from a first end positioned adjacent the steering column mount to a second end operably connected to the front of the frame forward along a longitudinal centerline of the forward frame of at least a portion of the spindle, wherein the steering column extends entirely over the top of the spindle when viewed from the side of the forward frame.

Embodiments further include a spindle, comprising an upper control arm mount, a lower control arm mount with a steering axis is defined through the upper control arm mount and the lower control arm mount, a base including a ski mount, the ski mount including a hole defining an axis X, a spindle body including a spine, a front fin extending from a front surface of the spine, and a rear fin extending from a back surface of the spine, wherein the steering axis is disposed forward of the axis X of the ski mount.

Embodiments further include a snowmobile, comprising a frame, a ski, an engine, and a spindle connecting the frame to the ski. The spindle includes a lower control arm mount and a spindle body, the lower control arm mount having a first height relative to a ground plane, the spindle securing the frame to the ski. The snowmobile further includes a track drive coupled to the engine, the track drive including a bottom track drive sprocket, the bottom track drive sprocket defining a track drive axis, the track drive axis having a second height relative to the ground plane, wherein the first height is between 66% to 75% of the second height.

Embodiments further include a spindle comprising an upper control arm mount, a lower control arm mount, a base comprising a ski mount, and a body extending between the base and the upper control arm mount, the body comprising a double curve defining a first forward facing concavity positioned along the body between the upper control arm mount and the lower control arm mount, a second forward facing concavity positioned along the body between the lower control arm mount and the base, and a rearward facing concavity positioned along the body between the first forward facing concavity and the second forward facing concavity.

BRIEF DESCRIPTION OF DRAWINGS

This written disclosure describes illustrative embodiments that are non-limiting and non-exhaustive. Reference is made to illustrative embodiments that are depicted in the figures, in which:

FIG. 2A illustrates a top view of a spindle take at line A-A, according to some embodiments of this disclosure.

FIG. 2B illustrates a top view of a spindle take at line B-B, according to some embodiments of this disclosure.

FIG. 2C illustrates a top view of a spindle take at line C-C, according to some embodiments of this disclosure.

FIG. 2D illustrates a top view of a spindle take at line D-D, according to some embodiments of this disclosure.

FIG. 2E illustrates a top view of a spindle take at line E-E, according to some embodiments of this disclosure.

DETAILED DESCRIPTION

Embodiments of the present disclosure describe a spindle, a suspension system including one or more spindles, and recreational vehicles utilizing a suspension system including one or more spindles. Although discussion herein is directed to the use of the spindle in a snowmobile, a spindle as disclosed herein may also be used in four-wheelers such as all-terrain vehicles (ATVs) and side-by-side vehicles (SxS or UTVs).

Figure 1A:
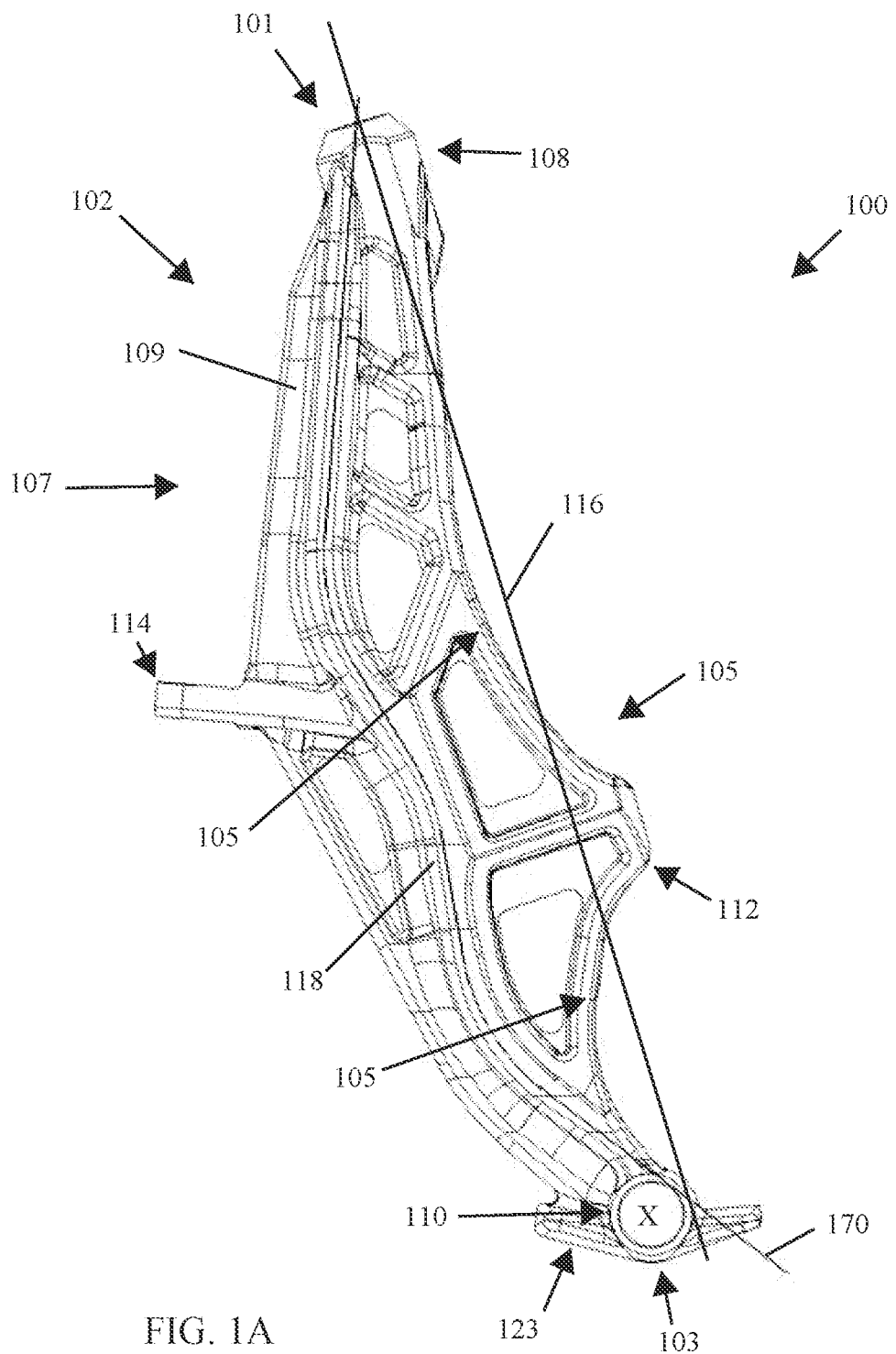
FIG. 1A illustrates an outboard side view of a spindle, according to some embodiments of this disclosure.
Figure 1B:
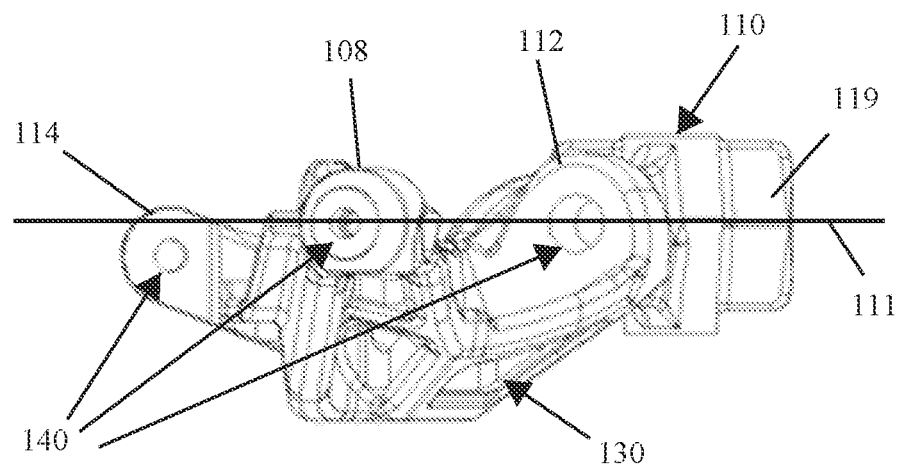
FIG. 1B illustrates a top view of a spindle, according to some embodiments of this disclosure.
Figure 1C:
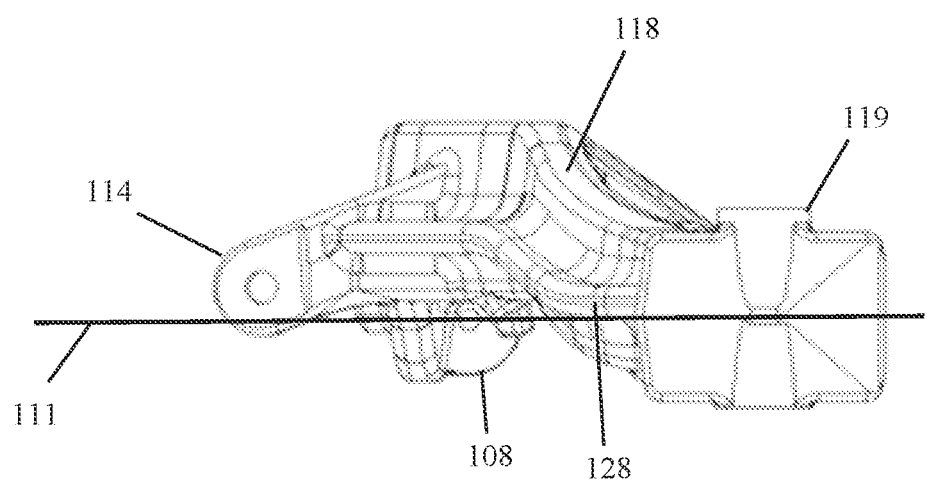
FIG. 1C illustrates a bottom view of a spindle, according to some embodiments of this disclosure.
Figure 1D:
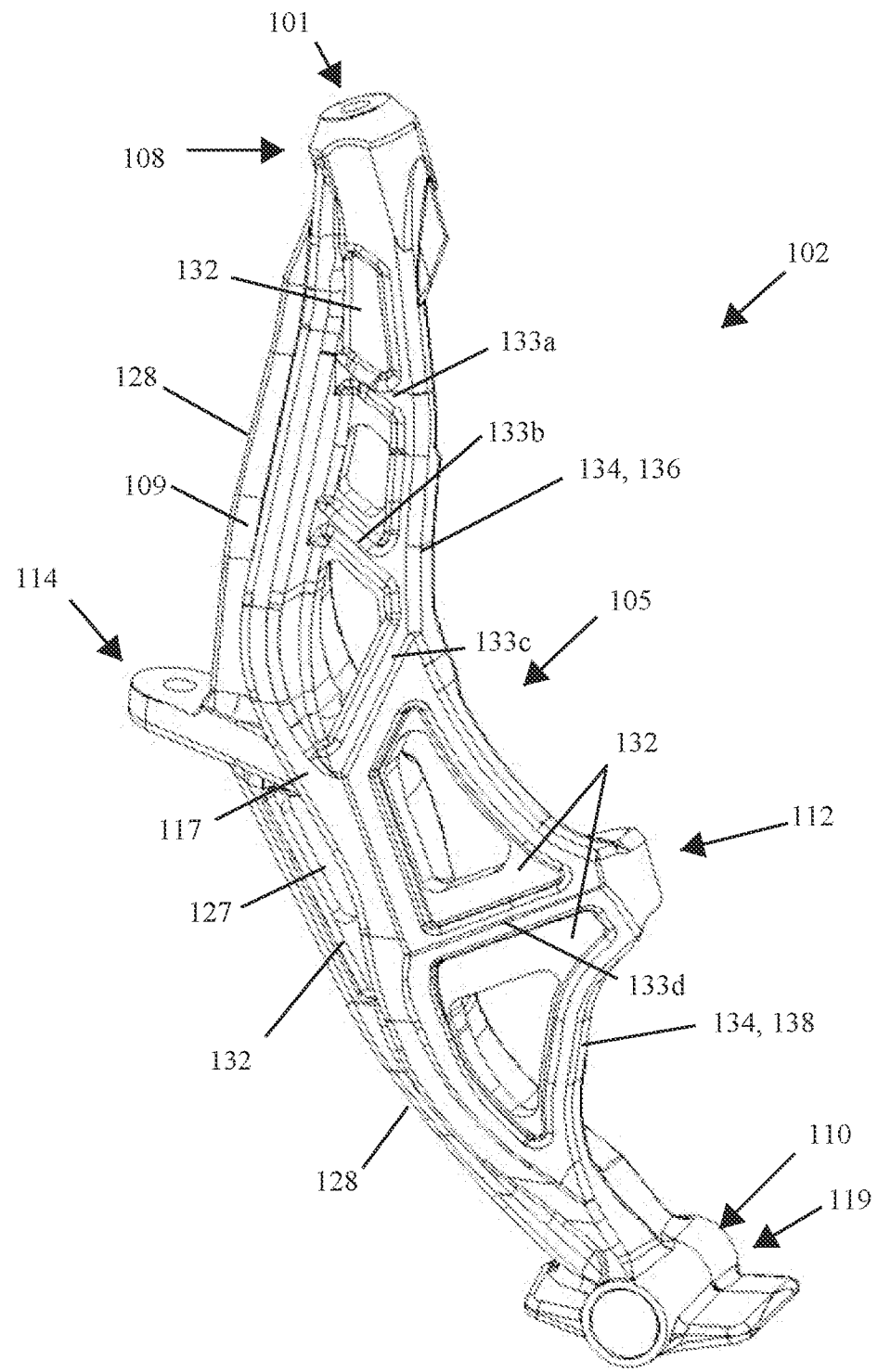
FIG. 1D illustrates a perspective outboard side view of a spindle, according to some embodiments of this disclosure.
Figure 1E:
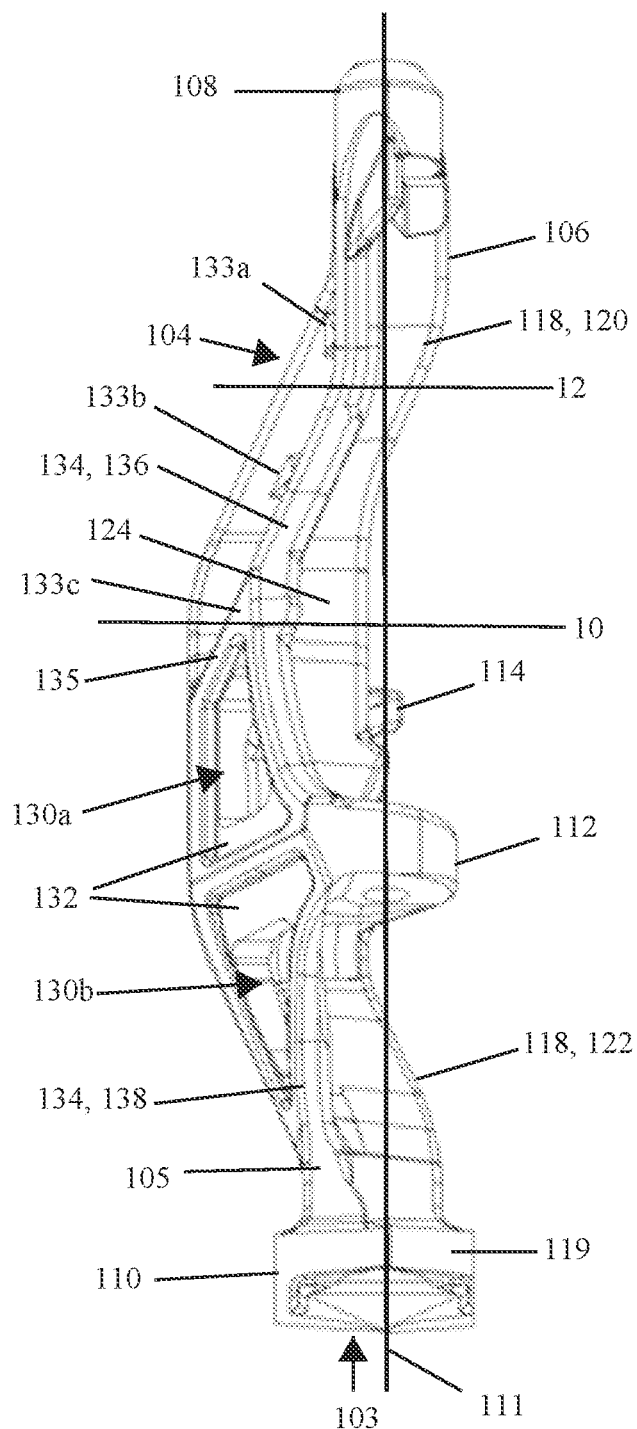
FIG. 1E illustrates a front view of a spindle, according to some embodiments of this disclosure.
Figure 1F:
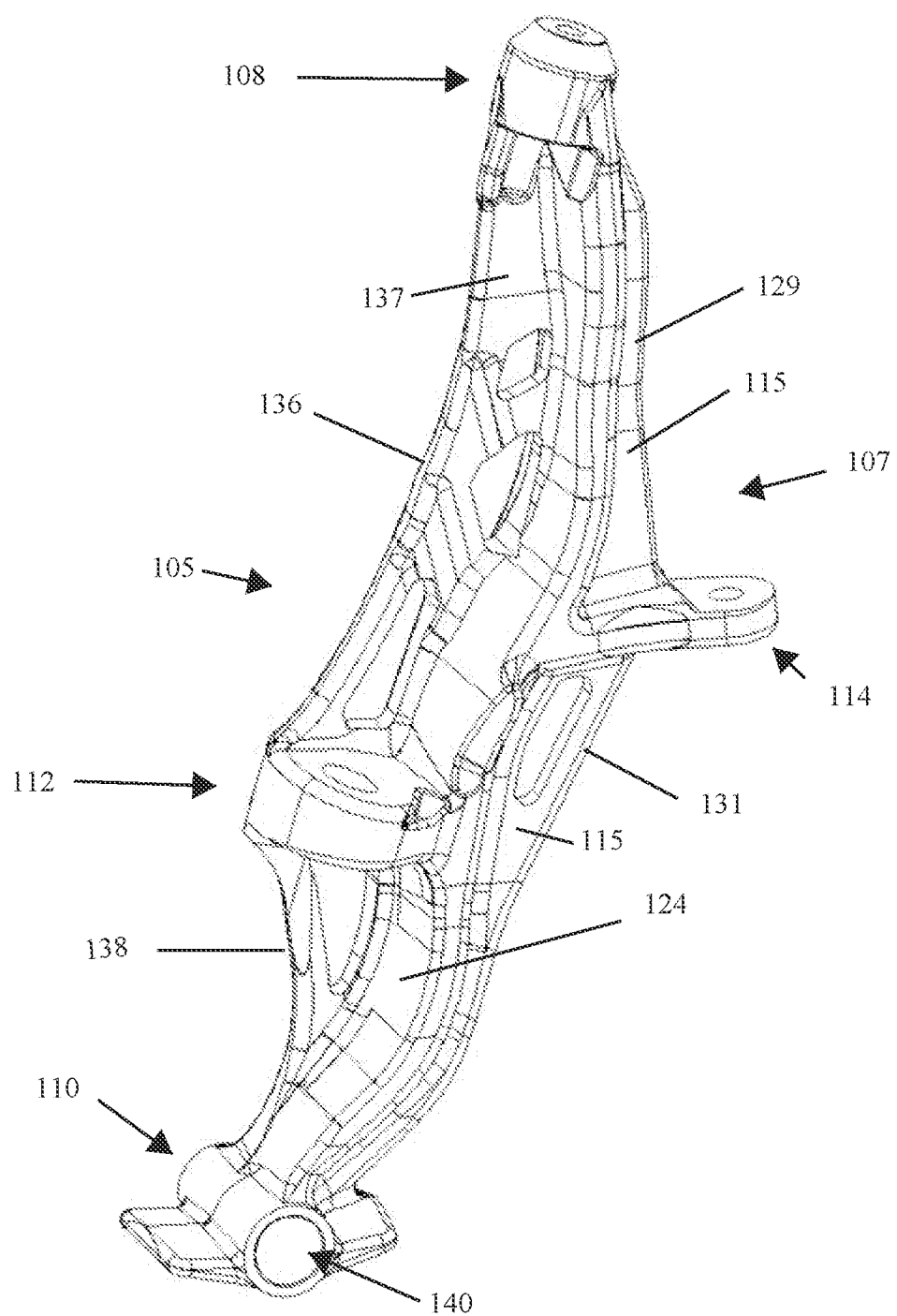
FIG. 1F illustrates a perspective inboard side view of a spindle, according to some embodiments of this disclosure.
Figure 1G:
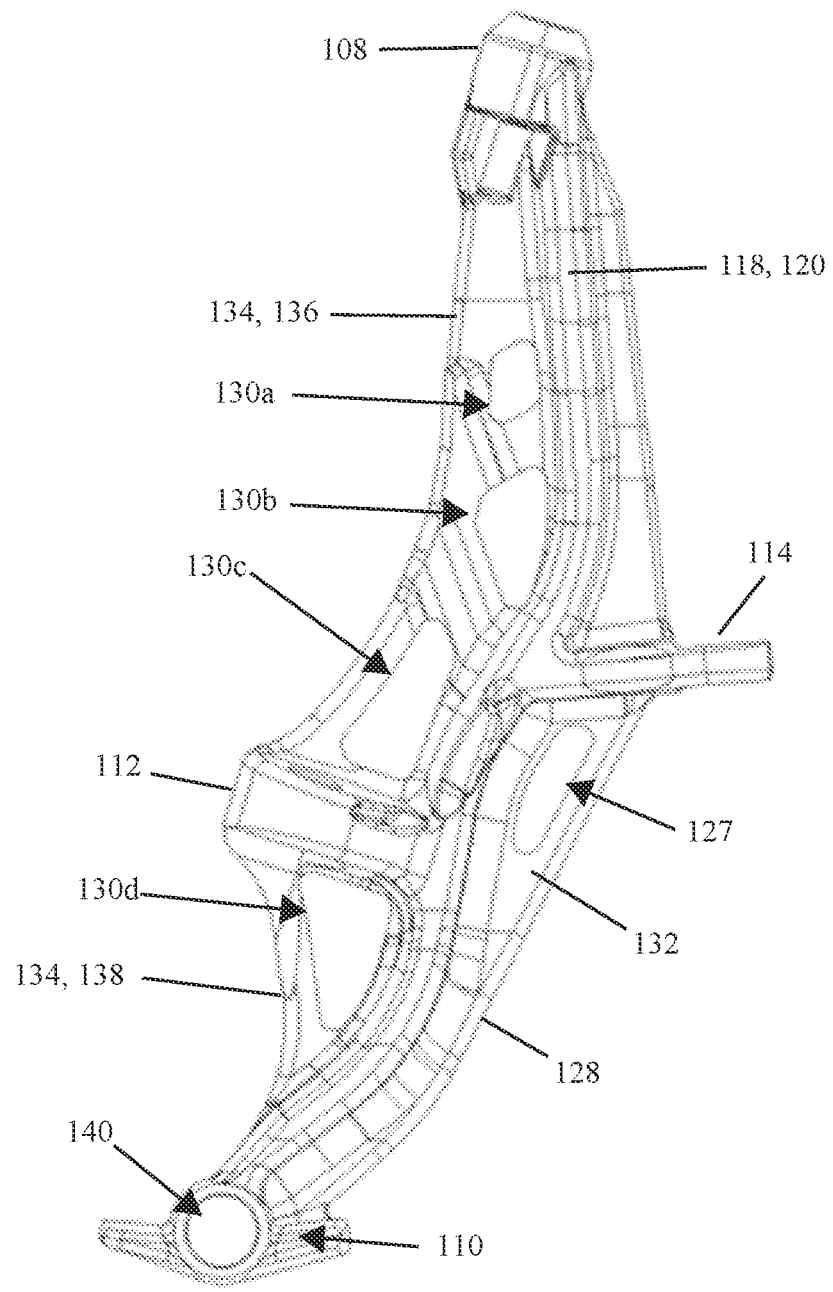
FIG. 1G illustrates an inboard side view of a spindle, according to some embodiments of this disclosure.

FIGS. 1A-I are views of a spindle 100 according to some embodiments of this disclosure. The views respectively include an outboard side view, a top view, a bottom view, a perspective outboard side view, a front view, a perspective inboard side view, an inboard side view, a rear view, and a top view. FIG. 1G is an illustration of the spindle 100 as it would be oriented when the snowmobile is on a flat surface without a rider. The spindle 100 has a spindle body 102 with an outboard edge 104, an inboard edge 106, a leading edge 105, a trailing edge 107, an upper end 101, a bottom end 103. In some embodiments, the outboard edge 104, inboard edge 106, leading edge 105, and/or trailing edge 107 are curvilinear (see e.g., FIGS. 1E and 1H). In one aspect, the leading edge 105 is formed by the upper control arm mount 108, the lower control arm mount 112, front fin 134, and base 119 (see e.g., FIGS. 1A, D, and F). In some embodiments, the leading edge 105 twists or rotates going from the lower control arm mount 112 to the base 119 (see e.g., FIG. 1E). In another aspect, the trailing edge 107 is formed by the upper control arm mount 108, rear fin 128, and tie rod mount 114 (see e.g., FIGS. 1A and F). The upper end 101 includes the upper control arm mount 108, and the bottom end 103 includes the base 119 (see e.g., FIGS. 1A and 1D-1E).

The spindle 100 has a length measured from the upper end 101 to the bottom end 103. In some embodiments, the length from the upper end 101 to the bottom end 103 is approximately 400 mm to approximately 406 mm. In one example, the length from the upper end 101 to the bottom end 103 is approximately 400 mm. In another example, the length from the upper end 101 to the bottom end 103 is approximately 406 mm.

The spindle body 102 includes one or more of an upper control arm mount 108, a base 119 defining a ski mount 110 that includes an opening 140 for operably connecting the spindle 100 to a ski 410, a lower control arm mount 112, and a tie rod mount 114, as discussed below in greater detail. In some embodiments, the region of the spindle body 102 between the base 119 and the lower control arm mount 112 has greater amount of mass than the region of the spindle body between the lower control arm mount 112 and the upper control arm mount 108. A vertical plane 111, that includes the long axis of the base 119, extends through the upper control arm mount 108 and the lower control arm mount 112 (see e.g., FIGS. 1B-C, 1E and 1H). In some embodiments, the base 119 includes tabs or feet 123 positioned forward and rearward of the ski mount 110. In one aspect, the tabs 123 interface with the ski 410 to limit/restrict an amount of rotation of the ski 410.

The spindle body 102 further includes a main member such as a spine/wall 118, a rear/rearward fin 128 extending from the spine 118, and a front/forward fin 134 extending from the spine (see e.g., FIGS. 1A-B). The spine/wall 118 extends vertically between the base 119 and the upper control arm mount 108, as can be seen by line 170 in FIG. 1A which travels alongside the spine 118. The spine 118 also extends between the outboard edge 104 and the inboard edge 106 of the spindle body 102. Thus, the spine 118 includes an inboard side forming at least a part of the inboard edge 106 and an outboard side forming at least a part of the outboard edge 106. In at least one embodiment, the spine 118 is solid. In another embodiment, at least a portion of the spine 118 is hollow.

Figure 3A:
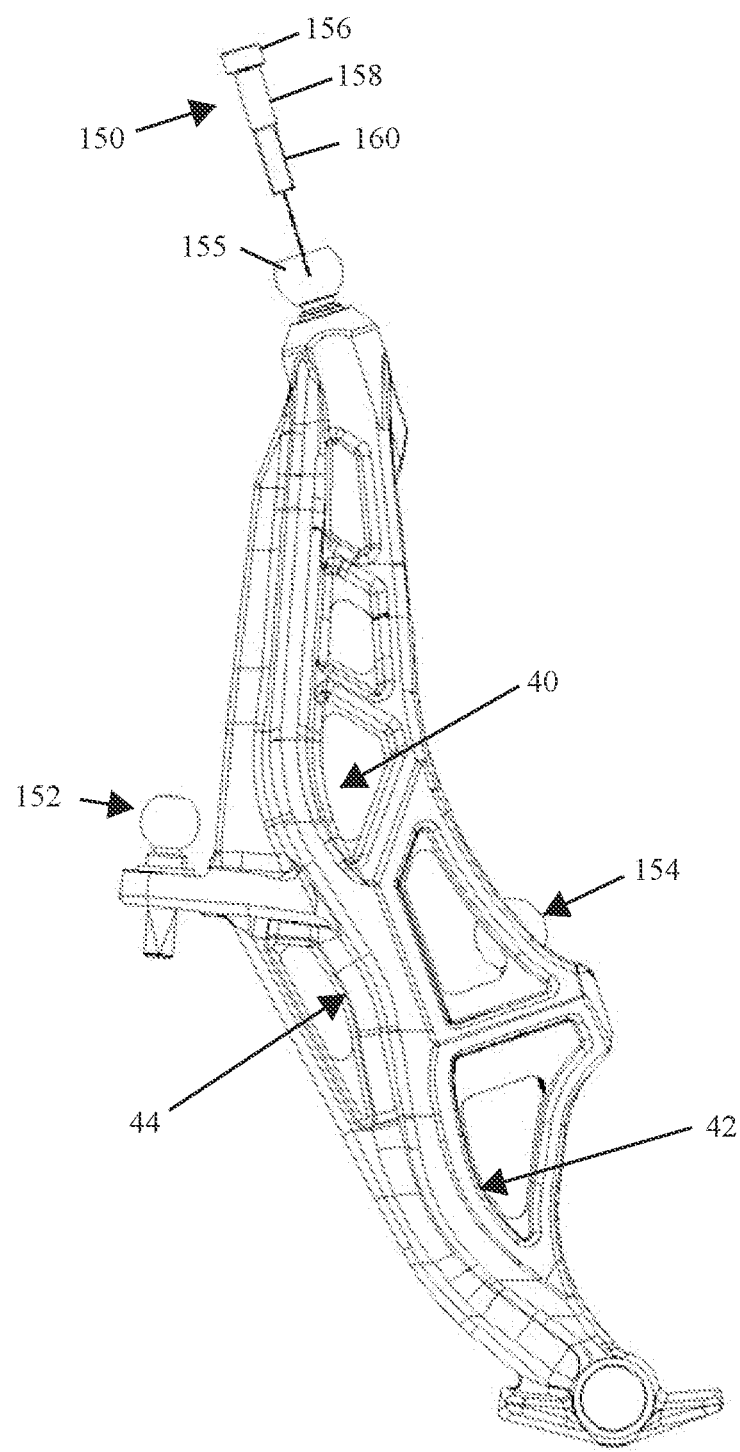
FIG. 3A is a side view of the spindle that illustrates a fastener aligned with the top mount for insertion therein and fasteners inserted into the front and rear mounts, according to some embodiments of this disclosure.

The spine 118 includes a front surface/face 124 and a rear surface/face 126. The front and rear surfaces 124, 126 of the spine 118 extend from the outboard edge 104 to the inboard edge 106. In some embodiments, the front surface 124 defines a first concave portion 40 along the upper portion 120 of the spine 118, and the front surface 124 defines a second concave portion 42 along the lower portion 122 of the spine 118. The rear surface 126 may define a third concave portion 44 positioned along the spine 118 between the first concave portion 40 and the second concave portion 42 (see e.g., FIG. 3A). In a non-limiting example, the spine 118 may be described as comprising a double curve defining a first forward facing concavity or concave portion 40 positioned along the spine 118 between the upper control arm mount 108 and the lower control arm mount 112, a second forward facing concavity or concave portion 42 positioned along the spine 118 between the lower control arm mount 112 and the base 119, and a rearward facing concavity or concave portion 44 positioned along the spine 118 between the first forward facing concavity or concave portion 40 and the second forward facing concavity or concave portion 42.

When viewed from the front, the spine 118 may be described as having an upper portion 120 extending from the upper control arm mount 108 to the lower control arm mount 112, and a lower portion 122 extending from the lower control arm mount 112 to the base 119 (see e.g., FIG. 1E). A mid-portion 121 may be provided between the upper portion 120 and the lower portion 122.

Figure 1H:
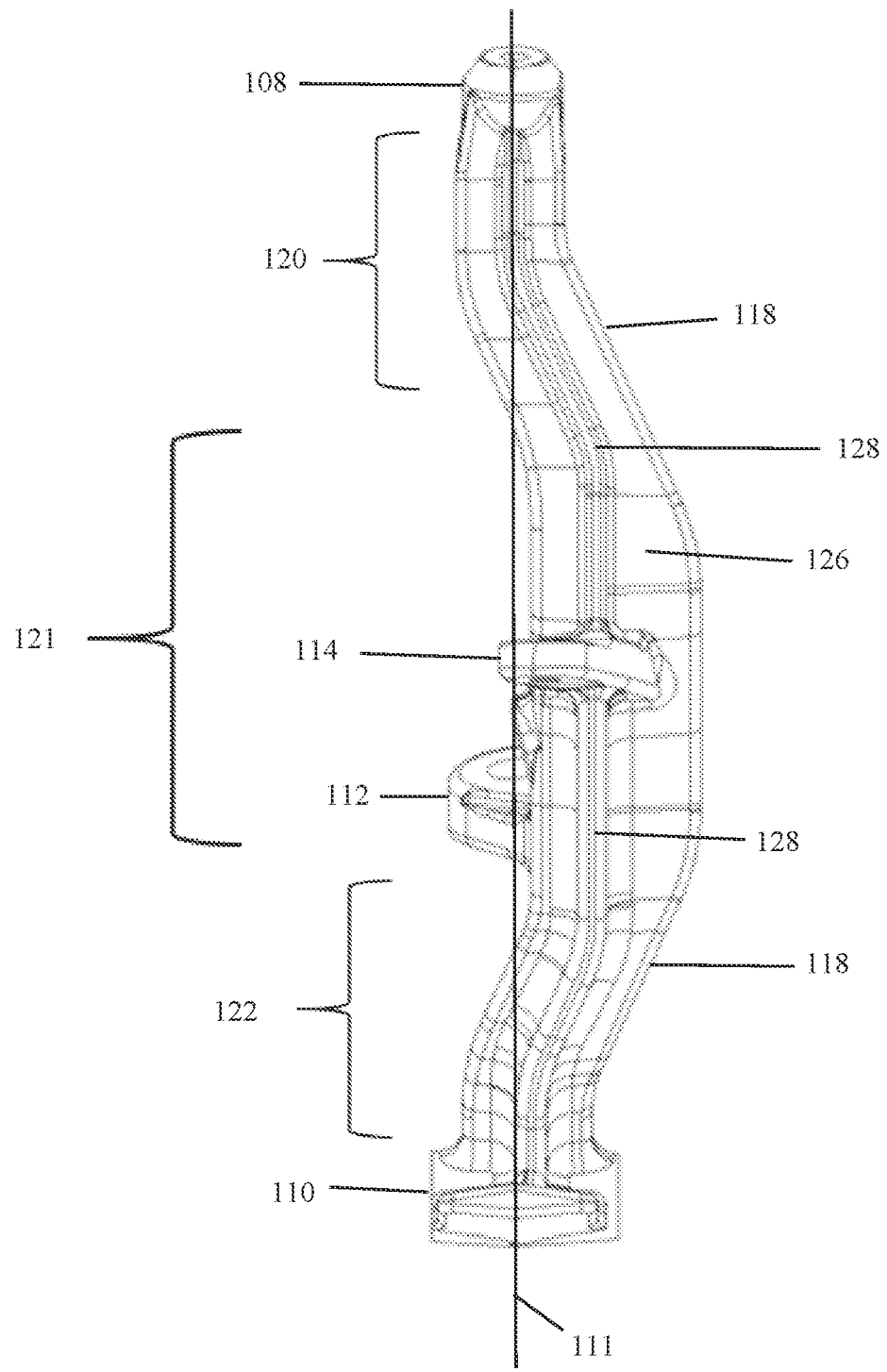
FIG. 1H illustrates a rear view of a spindle, according to some embodiments of this disclosure.
Figure 1I:
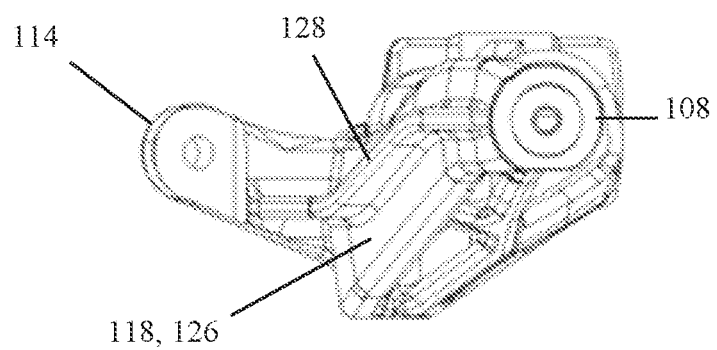
FIG. 1I illustrates a top view of a spindle viewed down the line defining the steering axis, according to some embodiments of this disclosure.
Figure 2:
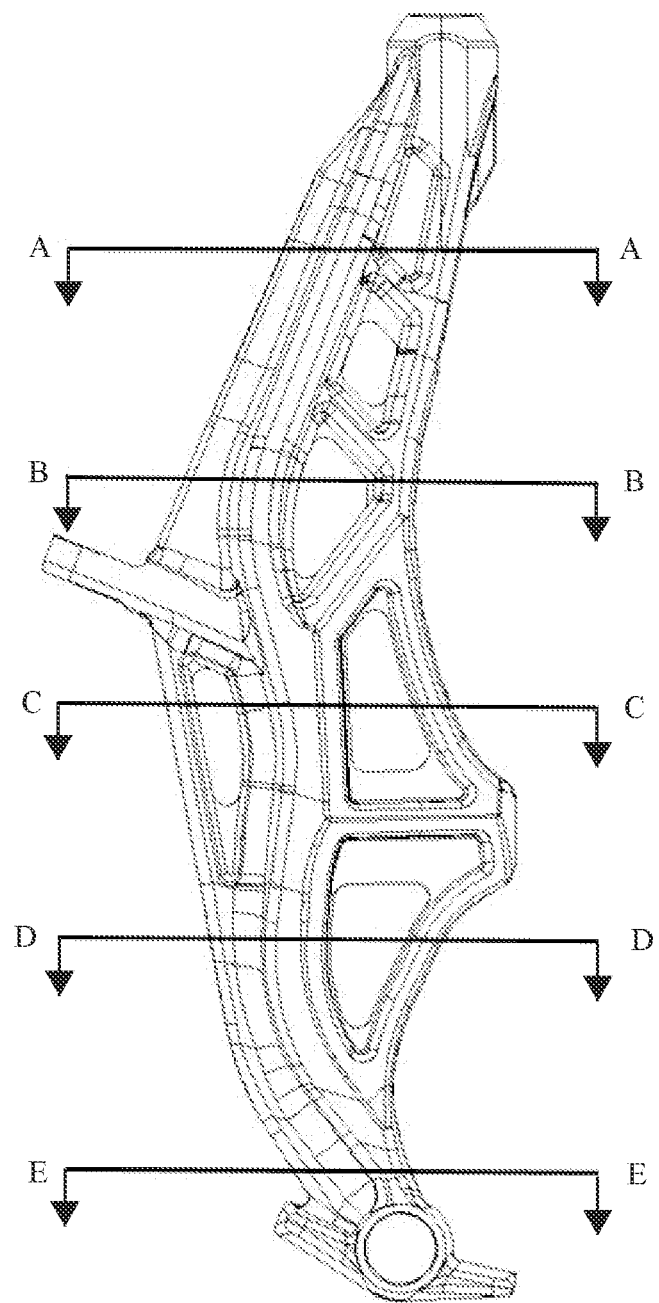
FIG. 2 illustrates an outboard side view of a spindle, according to some embodiments of this disclosure.

When viewed from the rear, the spine 118 may be described as having an upper portion 120 adjacent the upper control arm mount 108, a lower portion 122 adjacent to the base 119, and a mid-portion 121 between the upper and lower portions 120, 122 (see e.g., FIG. 1H). In some embodiments, the lower control arm mount 112 and the tie rod mount 114 are positioned within the mid-portion 121. In other embodiments, the lower control arm mount 112 is positioned within the lower portion 122 and the tie rod mount 114 is positioned within the mid-portion 121. The mid-portion 121 of the spine 118 may be offset from the upper portion 120 and the lower portion 122. In a non-limiting example, the outboard edge 104 of the mid-portion may be positioned farther outboard than in the outboard edges 104 of the upper and lower portions 120, 122, as shown in FIGS. 1E and 1H. The portion of the spine 118 located in the mid-portion 121 is offset outboard from line 111 and from the upper portion and lower portion as shown in FIGS. 1E and 1H. In an illustrative example, the inboard edge 106 of the mid-portion 121 is at least partially positioned outboard of the steering axis 116 that extends through the upper control arm mount 108 and the lower control arm mount 112.

In some embodiments, when viewed from the side, the spine 118 is curvilinear or generally S-shaped (see e.g., FIG. 1A). In some embodiments, the upper portion 120 is curvilinear and the lower portion 122 is curvilinear (see e.g., FIG. 1E). In this example, the outboard and inboard sides of the spine 118 are curvilinear. In other embodiments, when viewed from the front, the outboard edge 104 of the upper and lower portions 120, 122 are linear, the inboard side 106 of the upper and lower portions 120, 122 are curved and the outboard and inboard edges 104, 106 between the upper and lower portions 120, 122 are linear. In one aspect, the weight of the spindle body 102 may be reduced by utilizing a curvilinear shaped spine 118 that positions the spine 118 closer the mounting points because mass is located where necessary to provide support.

The width (measured inboard to outboard) of the spine 118 may be uniform or non-uniform. In some embodiments, the spine 118 has a width of approximately 36 mm to approximately 56 mm. In at least one embodiment, the width of the mid-portion 121 is 1.3 to 1.9 times the width of the upper portion 120, and 1 to 1.6 times the width of the lower portion 122. In one example, the spine 118 has an average width of approximately 46 mm. The thickness (measured forward to rearward) of the spine 118 may be uniform or non-uniform. In some embodiments, the spine 118 has a thickness of approximately 10 mm to approximately 12 mm. In one aspect, a thicker section of the spine 118 may handle greater loads than a thinner section. For example, optionally, the upper portion 120 and the lower portion 122 each has a width that is less than the width of the mid-portion 121. The increased width of the mid-portion 121 provides extra strength in the region where the tie rod mount 114 and the lower control arm mount 112 are secured to the spine 118.

The front fin 134 extends forward from the front surface 124 of the spine 118 to form a part of the leading edge 105 of the spindle body 102 (see e.g., FIGS. 1E-F). The front fin 134 includes an outer surface 135 generally facing outward and an inner surface 137 generally facing inward.

In at least one embodiment, the front fin 134 is positioned at an outboard edge 104 of the spine 118 (see e.g., FIGS. 1D-G). As shown in FIG. 1E, the front fin 134 is positioned outward relative to plane 111 extending through the upper control arm mount 108, the lower arm control mount 112, and the base 119. In a non-limiting example, a portion of the front fin 134, such as the portion of the front fin 134 positioned forward of the upper portion 120 of the spine 118, may extend from the front surface 124 inboard of the outboard edge 104 of the spine 118. In some embodiments, the front fin 134 provides strength to the spindle 100. In some embodiments, at least a portion of the front fin 134 is angled toward the inboard edge 106 of the spindle 100.

In at least one embodiment, the front fin 134 has at least one window/cutout 130. One aspect of the window/cutout is to reduce the weight of the spindle 100. The window(s) 130 may be oriented generally perpendicular to the front surface 124 or oriented at an angle to the front surface 124 (see e.g., FIG. 1E). In a further embodiment, the front fin 134 further includes at least one recess 132 (see e.g., FIG. 1D). As used in this application, a recess 132 may be inset from both the inner and outer surfaces 135, 137 or inset from only one of the inner or outer surfaces 135, 137. One aspect of recess 132 is to reduce the weight of the spindle 100. Another aspect of recess 132 is to provide the front fin 134 with a non-uniform width. In a further aspect, the front fin 134 has at least one I shaped support member formed by a recess 132. In some embodiments, the recess has a depth of approximately 3 mm. In other embodiments, the recess has a depth of at most 3 mm.

In some embodiments, a plurality of support members 133 that extend from the spine 118 to the front fin 134 to provide support to the front fin 134 (see e.g., FIG. 1D). Support member 133 may extend upwards from a spine location 117 adjacent to an end of the tie rod mount 114 to a second end. Support member 133d may extend alongside the lower control arm mount 112 to the spine 118. In one example, there are four support members 133a-d. The support members 133 are separated by adjacent windows 130 or a recess 132 adjacent to a window (see e.g., FIG. 1D). In one example, the upper portion 136 has a plurality of windows 130 and a recessed portion 132, and the lower portion 138 has a plurality of windows 130. In some embodiments, one or more of the windows 130 is at least partially defined by a recessed surface 132 (see e.g., FIGS. 1D and 1G).

The front fin 134 may include an upper portion 136 and a lower portion 138 (see e.g., FIG. 1D). The upper portion 136 and/or lower portion 138 may be concave. The front fin 134 may further include a mid-portion positioned between the upper portion 136 and the lower portion 138. The mid-portion may be positioned adjacent the lower control arm mount 112 and include windows 130a, 130b. In some embodiments, the leading edge 105 along the part of the front fin 134 located in the mid-portion is offset to the outboard side from the upper portion of the front fin 134.

When viewed from the side, the front fin 134 may be described as including an upper portion 136 extending between the upper control arm mount 108 and the lower control arm mount 112 and a lower portion 138 extending between the lower control arm mount 112 and the ski mount 110 (see e.g., FIGS. 1A, 1D and 1G). The upper portion 136 may include a recess 132 and one or more windows 130. In one embodiment (as shown in FIG. 1G), the upper portion 136 may include three windows 130a, 130b, 130c. The lower portion 138 may include one or more windows 130. As shown in FIG. 1G, the lower portion 138 includes one window 130d.

When viewed from the front, the front fin 134 may be described as comprising an upper portion 136 extending forward from the front surface 124 in a generally perpendicular direction and a lower portion 138 extending forward from the front surface 124 at an inward direction (see e.g., FIG. 1E). In some embodiments, the upper portion 136 extends from the upper control arm mount 108 to the lower portion 138 that extends from a position above the tie rod mount 114 (e.g., above line 10) to the base 119. Due to the inward orientation of the lower portion, the support members 133c, 133d and windows 130a and 130b are visible and the front surface 124 may be viewed through windows 130a, 130b. Due to the generally perpendicular orientation of the upper portion 136, at most only a portion of support members 133a, 133b is visible.

The front fin 134 has a width (measured inboard to outboard) that may be uniform or non-uniform. In at least one embodiment, the width of the front fin 134 is less than the width of the spindle body 102 (see e.g., FIGS. 1E-F). In a non-limiting example, a part of the upper portion 136 may have a width that is greater than the other parts of the upper portion 136 to provide increased strength to withstand higher stresses applied to this region. The wider part may comprise a length that begins adjacent to or below support member 133a where the front fin 134 begins to extend outboard to the support member 133c, positioned immediately above the lower control arm mount 112 (see e.g., length bounded by lines 10 and 12 of FIG. 1E). In some embodiments, the front fin 134 has a width of approximately 10 mm to approximately 13 mm.

The forward extent/length of the front fin 134 may be non-uniform. For example, in some embodiments, the front edges of the upper and lower portions 136, 138 forming a part of the spindle leading edge 105, are concave (see e.g., FIG. 1A). In some embodiments, the front fin 134 has a forward length of 0 mm to approximately 60 mm. In one example, the longest forward length of the front fin 134 is above the lower control arm mount 112.

The rear fin 128 extends back from the rear surface 126 of the spine 118 (see e.g., FIGS. 1A and 1D). In some embodiments, the rear fin 128 extends continuously along the length of the rear surface 126 from the upper control arm mount 108 to the base 119. The rear fin 128 includes an outer surface 109 generally facing outward, an inner surface 115 generally facing inward, and a rear edge forming at least a portion of the trailing edge 107. In at least one embodiment, the rear edge of the upper portion 129 and the lower portion 131 of the rear fin 128 is curvilinear (see e.g., FIG. 1F).

The rear fin 128 further includes an upper portion 129 and a lower portion 131. In some embodiments, the tie rod mount 114 separates the upper and lower portions 129, 131 of the rear fin 128 (see e.g., FIGS. 1C and 1H).

As shown in FIG. 1H, the rear fin 128 is positioned between the inboard and outboard edges 105, 107. In some embodiments, the rear fin 128 in the mid-portion 121 is offset outboard relative to the portions of the rear fin 128 extending along the upper and the lower portions 120, 122. In an embodiment, the rear fin 128 extends along the middle of the spine 118 in the upper and the lower portions 120, 122 and inboard of the middle of the mid-portion 121 of the spine 118. In one aspect, this placement of the rear fin 128 along the spine 118 assists the mid-portion 121 to carry loads experienced by the spindle 100. For example, the rear fin 128 may provide strength to the mid-portion 121 in a perpendicular direction to the spine 118. In some embodiments, a majority of the rear fin 128 is positioned outboard of plane 111.

The rear fin 128 may be described as including a first generally vertical linear section extending down from the upper control arm mount 108, a first angled linear section extending down from the first generally linear section, a second generally vertical linear section extending down from the first angled linear section, a second angled linear section extending down from the second generally vertical section and a third generally vertical linear section extending down from the second angled linear section to the base 119. Optionally, the second generally vertical linear section has the greatest length than the other sections. Optionally, the second generally vertical linear section is positioned between the middle of the spine 118 and the inboard side 106 of the spine while the other sections are positioned in the middle of the spine 118. Optionally, the tie rod mount 114 is positioned in the second generally vertical linear section.

In at least one embodiment, the width (measured inboard to outboard) of the rear fin 128 is less than the width of the spindle body 102 (see e.g., FIG. 1H). In some embodiments, the width of the rear fin 128 ranges from approximately 7 mm to approximately 10 mm. In one example, the rear fin 128 has an average width of approximately 8 mm. In some embodiments, the rear fin 128 has a greater width below tie rod mount 114 than above tie rod mount 114. In one example, the width of the rear fin 128 above the tie rod mount is about 65% to 75% of the width of the rear fin 128 below the tie rod mount 114. In one example, the rear fin 128 has a width of approximately 7 mm above the tie rod mount 114 and a width of approximately 10 mm below the tie rod mount 114. In one example, the width of the rear fin 128 is 15-20% of the width of the spine 118, and optionally about 18% the width of the spine 118.

The distance the rear fin 128 extends from the rear surface 126 may vary along the length of the rear surface 126 (see e.g., FIG. 1G). In some embodiments, the distance the rear fin 128 extends from the rear surface 126 increases as the rear fin 128 approaches the tie rod mount 114 to provide additional support to that region. In one example, the rear fin 128 below the tie rod mount 114 has the greatest rearward length. In some embodiments, the range for the rearward length from the spine 118 is approximately 0-34 mm. In other embodiments, the rear fin 128 has a maximum rearward length of approximately 34 mm. In some embodiments, the rearward length of the rear fin 128 is less than the forward length of the front fin 134 (see also FIG. 1A). In one example, the rearward length of the rear fin 128 is 50-65% of the forward length of the front fin 134, and optionally 55-60% of the forward length of the front fin 134.

In at least one embodiment, the rear fin 128 has at least one recess 132 and/or defines at least one window/cutout 127. In one example, the rear fin 128 defines one window 127. In some embodiments, window 127 is at least partially defined by a recessed surface 132 (see e.g., FIG. 1D).

In some embodiments, the majority of the spindle body 102 volume and/or mass is located behind the lower control arm mount 112. For example, in one embodiment, most of the spindle body 102 is positioned behind the steering axis 116 that extends through the upper control arm mount 108, the lower control arm mount 112 and extends just forward of the opening 140 of the ski mount 110 (see e.g., FIG. 1A). This is different from a spindle body that has the bulk of the spindle volume/material in-line with the lower control arm mount 112. In one particular example, at most 10% of the spindle body volume and/or mass is located in front of the steering axis 116. In a further embodiment, approximately the same amount of spindle body volume and/or mass is behind the spine 118, and between the spine 118 and the steering axis 116. In one example, approximately 10% of the spindle body volume is in front of the steering axis 116, approximately 90% of the body volume is behind the steering axis 116. In addition to, or alternatively, 50-60% of the body volume is located forward of the spine 118 (see line 119), and 40-50% of the body volume is located behind the spine 118, and approximately 40-50% of the body volume is located between the spine 118 and the steering axis 116.

In at least one embodiment, the majority of the spindle body 102 volume and/or mass is located outboard of plane 111 (see e.g., FIG. 1H). In one aspect, this configuration manages the loads experienced by the spindle 118 when coupled to a vehicle.

Figure 5:
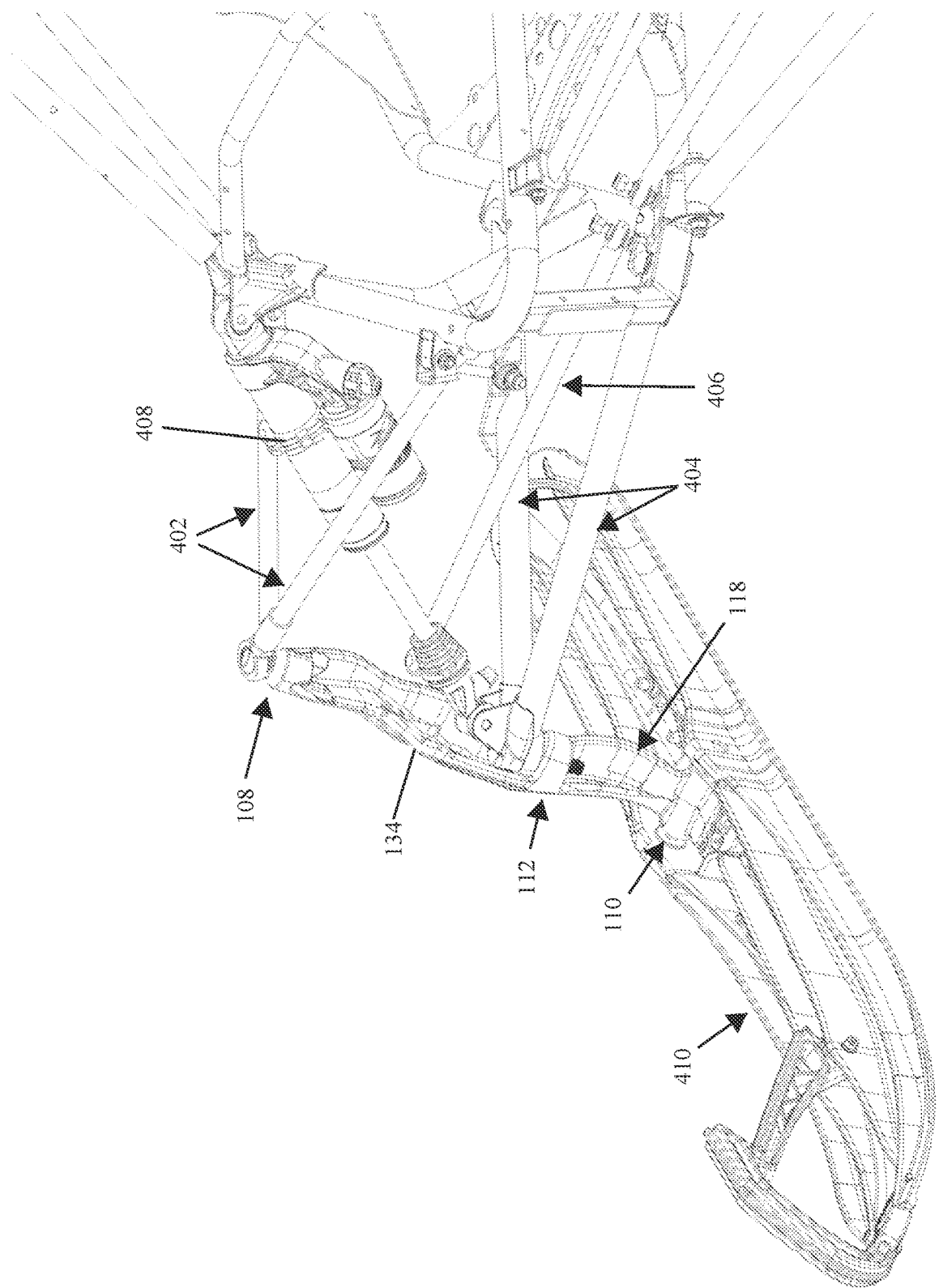
FIG. 5 is a perspective partial inside view of the spindle, suspension system, and chassis, according to some embodiments of this disclosure.

The front and rear fins 134, 128 may be configured to manage the load in the forward and rear directions (fore and aft load). In embodiments where the spindle 100 forms a part of the front suspension of a snowmobile, the lower leading and trailing spindle edges 105, 107 may be configured to manage the fore and aft load from the ski 410 (see e.g., FIG. 5).

In some embodiments, the spine 118, the rear fin 128, and the front fin 134 are arranged in a plus sign (+) configuration (see e.g., FIGS. 2A-E). The spine 118 forms two arms and the front and rear fins 134, 128 form the other two arms. With this configuration, the cross-section of spindle body 102 is generally shaped like a plus sign (+). In some embodiments, the shape of the plus sign (+) changes along the length of the spindle 100, e.g., from top to bottom. For example, the length of an arm of the plus sign may change, the relative positions of the arms may change, and/or the size of an arm may change (see e.g., FIGS. 2A-E). In some embodiments, the cross-section of the spindle body 102 near the upper control arm mount 108 is generally a plus sign (+) shape and the cross-section of the spindle body 102 near the ski mount 110 is generally T-shaped. In some embodiments as shown in FIGS. 2A-E, the front fin 134 connections to the spine 118 are all positioned outboard of the opposing rear fin 128 connections to the spine 118 when the ski 410 is aligned with the longitudinal axis of the snowmobile. Without being limited to any particular theory, the positioning of the front fin 134 connections outboard of the rear fin 128 connections may provide the spindle 100 with more resistance to twisting. In addition, positioning the front fin 134 along the outboard edge 104 of the spine 118 may provide clearance for connecting the lower A-arm 404 to the lower control arm mount 112.

In some embodiments, when the spindle 100 is viewed from above, the upper control arm mount 108 is positioned rearward of the base 119 and between the lower control arm mount 112 and the tie rod mount 114 (see e.g., FIG. 1B). In other embodiments, when the spindle 100 is viewed from above down the line defining the steering axis, the upper control arm mount 108 may be positioned over the base 119 (see e.g., FIGS. 1H and 1I). Optionally, the upper control arm mount 108 is positioned at an angle (see e.g., line 116 of FIG. 1A). In some embodiments, when the spindle 100 viewed from below, the upper control arm mount 108 is viewable (see e.g., FIG. 1C)

In at least one embodiment the lower control arm mount 112 extends forward from the front surface 124 of the spine 118. In some embodiments, the lower control arm mount 112 further extends inboard and/or upward. In one example, the lower control arm mount 112 extends forward, inboard, and upward from the front surface 124 of the spine 118. In some embodiments, the lower control arm mount 112 is positioned over the base 119 so that the lower control arm mount 112 is viewable when the spindle 100 is viewed from above and is not viewable when the spindle 100 is viewed from below (see e.g., FIGS. 1B-C). In other embodiments, the lower control arm mount 112 is not viewable (see e.g., FIG. 1I). For example, the upper control arm mount 108 may be positioned over the lower control arm mount 112. In one embodiment, the lower control arm mount 112 extends inward from an inboard surface of the front fin 134 (see e.g., FIGS. 1D-F). In another embodiment, a side of the lower control arm mount 112 forms a part of the front fin 134 (see e.g., FIGS. 1D-F). In some embodiments, the lower control arm mount 112 extends forward towards the inboard edge 106. The lower control arm mount 112 has a vertical position between the tie rod mount 114 and the ski mount 110.

In at least one embodiment, the tie rod mount 114 extends rearward from the spine 118. In some embodiments, the tie rod mount 114 further extends inboard and/or upward. In one example, the tie rod mount 114 extends backward, inboard, and upward from a point on the rear surface 126 of the spine 118 that is vertically positioned slightly below the bottom of the concave portion of the front surface 124 of the spine 118 (see e.g., FIGS. 1G-H). This positions the opening 140 on the tie rod mount 114 close to the spine 118, thereby increasing the strength of the tie rod mount 114. In some embodiments, this configuration allows the tie rod mount 114 to be located closer to the spine 118 than for a typical spindle. The tie rod mount 114 has a vertical position between the upper control arm mount 108 and the lower control arm mount 112.

In some embodiments, the tie rod mount 114 has a greater rearward extent than the rear fin 128—in other words, the tie rod mount 114 extends further rearward than the rear fin 128 (see e.g., FIGS. 1A, 1C, and 1F). In some embodiments, the tie rod mount 114 extends approximately 40 mm farther rearward than the rear fin 128.

Figures 3B, 3C:
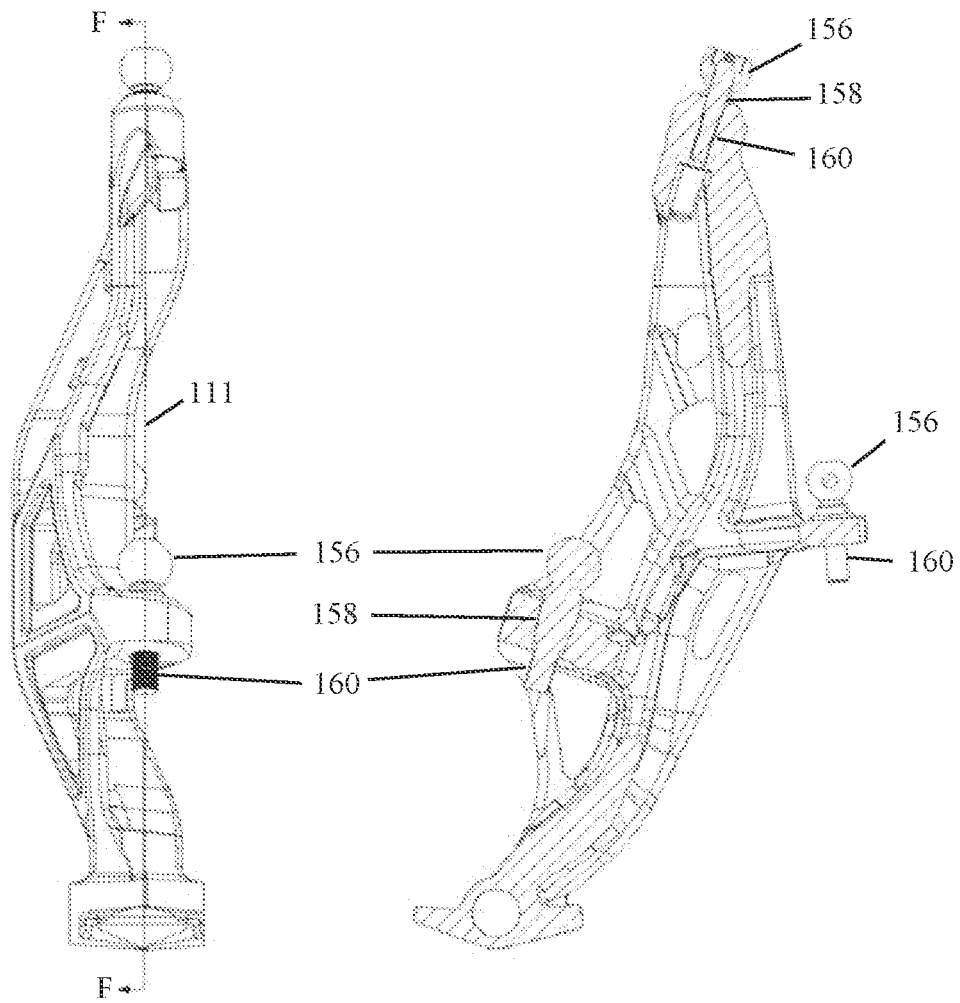
FIG. 3B is a front view of a spindle with fasteners inserted into the spindle, according to some embodiments of this disclosure.
FIG. 3C is a cross-sectional side view of FIG. 3B taken at line F-F, according to some embodiments of this disclosure.

As shown in FIGS. 3B-C, the upper control arm, ski, and lower control arm mounts 108, 110, 112 are aligned along a plane defined by line A-A with the tie rod mount 114 being slightly offset outboard of plane 111. In one aspect, this configuration manages loads experienced by a spindle 100 coupled to a front suspension.

A function of the mounts 108, 112, 114 is to attach the spindle 100 to a front suspension as discussed below in reference to FIGS. 4-10B. The upper control arm mount 108, the ski mount 110, the lower control arm mount 112, and the tie rod mount 114 each define at least one opening/hole 140 for attaching the spindle 100 to a suspension and/or frame of a recreational vehicle. The mount holes 140 are configured to receive a fastener 150, 152, 154. In some embodiments, the upper control arm, lower control arm, and tie rod mount holes 140 are through holes (see e.g., FIGS. 3A-C). In other embodiments, the upper control arm mount hole 140 is a blind hole, while the lower control arm hole 140 and the tie rod mount hole 140 are through holes.

In at least one embodiment, each of the fasteners 150, 152, 154 include a head 156 and a body. In one example, the fasteners 150, 152, 154 have a length of approximately 42-62 mm. In some embodiments, each of the fasteners 150, 152, 154 have approximately equal lengths. In other embodiments, one or more of the fasteners 150, 152, 154 may have different lengths. In some embodiments, the fastener body includes a first body portion 158, and a second body portion 160. The first and second body portions 158, 160 may have the same diameter or different diameters. In some embodiments, the first body portion 158 has a greater diameter than the second body portion 160 (see e.g., FIG. 3A). In one example, the first body portion 158 has a diameter of approximately 9 mm and the second body portion 160 has a diameter of approximately 8 mm. In another example, the fastener body tapers. In at least one embodiment, the first body portion and/or second body portion is threaded to mate with a threaded section of the wall defining the mount hole 140 (see e.g., FIGS. 3B-C) or a separate component such as a threaded nut. In at least one embodiment, the head 156 is positioned within a ball 155, or the head 156 is a ball, so that the fastener 150, 152, 154 forms a part of a ball and socket joint (ball joint). In some embodiments, the upper control arm mount 108, the lower control arm mount 112, and the tie rod mount 114 each form a part of a ball joint.

In some implementations, the spindle 100 includes an upper control arm mount 108, a base 119 defining an opening 140 for operably connecting the spindle 100 to a ski 410, the opening 140 including an axis X (the axis X serving as an axis of rotation), a lower control arm mount 112, and a body 118 extending between the upper control arm mount 108 and the base 119. The body 118 includes a forward face 124 that defines a first concave portion 40 along the body 118 between the upper control arm mount 108 and the lower control arm mount 112, and a second concave portion 42 along the body 118 between the lower control arm mount 112 and the base 119. The body 118 further includes rearward face 126 that defines a third concave portion 44 positioned along the body 118 between the first concave portion 40 and the second concave portion 42. Optionally, a tie rod mount 114 extends upward and rearward from the rear face 126. Optionally, the tie rod mount 114 extends from the third concave portion 44 of the of the rear face 126. In some embodiments, the body 118 comprises an upper portion 120 adjacent the upper control arm mount 108, a lower portion 122 adjacent the base 119, and a mid portion 121 adjacent the lower control arm mount 112, wherein the mid portion 121 is outboardly offset from the upper portion 120 and the lower portion 122. Optionally, the width of the body 118 along the upper portion 120 and the lower portion 122 is less than the width of the body 118 in the mid portion 121.

In other implementations, the spindle 100 includes an upper control arm mount 108, a lower control arm mount 112, a base 119, a body 118, and a front fin 134. The base 119 defines an opening 140 for operably connecting the spindle 100 to a ski 410 (e.g., ski mount 110). The opening 140 includes an axis X. The body 118 extends between the upper control arm mount 108 and the base 119 and includes a forward face 124. The front fin 134 extends forward from the forward face 124 and defines a first concave portion 136 along the body 118 between the upper control arm mount 108 and the lower control arm mount 112, and a second concave portion 138 along the body 118 between the lower control arm mount 112 and the base 119. In some embodiments, the body 118 comprises an upper portion 120 adjacent the upper control arm mount 108, a lower portion 122 adjacent the base 119, and a mid portion 121 adjacent the lower control arm mount 112. Optionally, the mid portion 121 is outboardly offset from the upper portion 120 and/or lower portion 122.

In some embodiments, the spindle 100 includes an upper control arm mount 108, a base 119, a lower control arm mount 112, a body 118, and a rear fin 128. The base 119 defines an opening 140 for operably connecting the spindle 100 to a ski 410, the opening 140 including an axis X. The body 118 extends between the upper control arm mount 108 and the base 119, and includes a forward face 124 and a rearward face 126. The rear fin 128 extends rearward from the rearward face 126 and along the length of the body 118 from the upper control arm mount 108 to the base 119. The spindle 100 further includes a tie rod mount 114 extending rearward from the rearward face 126. Optionally, the tie rod mount 114 further extends upward and inward. Optionally, the rear fin 128 extends from the upper control arm mount 108 to a top of the tie rod mount 114, and from the base 119 to the bottom of the tie rod mount 114. Optionally, the body 118 comprises an upper portion 120 adjacent the upper control arm mount 108, a lower portion 122 adjacent the base 119, and a mid portion 121 adjacent the lower control arm mount 112, wherein the mid portion 121 is outboardly offset from the upper portion 120 and the lower portion 122. Optionally, the rear fin 128 extending along the mid portion 121 of the body 118 is offset to the outboard side 104 from the portions of the rear fin 128 extending along the upper and lower portions 120, 122 of the body 118. Optionally, the rear fin 128 is positioned along the middle of the rear face 126 on the upper and lower portions 120, 122 of the body 118, and between the middle and the inboard side 106 of the mid portion 121 of the body 118.

The composition of the spindle 100 and method of making is not limited. In an illustrative example, the spindle 100 may comprise a lightweight metal or metal alloy including, but not limited to, steel, high strength steel, aluminum, aluminum alloys, magnesium, magnesium alloys, titanium, and titanium alloys. The spindle 100 may be manufactured by any suitable method including, but not limited to, casting, forging, and machining.

FIGS. 4-10B are top views, inside views, side views, front views, and back views showing the attachment of two spindles 100 to a chassis/frame 440 of a snowmobile, according to some embodiments. Frame 440 may be a common forward frame—in other words, a frame that may be used for different snowmobiles. The frame 440 may comprise the frame assembly disclosed in U.S. Provisional Application No. 63/344,165 filed on May 20, 2022 and titled "Snowmobile Frame," the contents of which are incorporated by reference in its entirety. In some embodiments, a spindle as disclosed herein is used in a snowmobile configured for trail riding. In a non-limiting example, a snowmobile configured for trail riding may have a minimum ski width of approximately 39 inches. In some embodiments, the snowmobile may have a minimum ski width of 34-45 inches. In other embodiments, the snowmobile may have a minimum ski width of 38-42 inches. In further embodiments, the snowmobile may have a minimum ski width of 34-35 inches. In one aspect, the spindle is lighter weight than a typical spindle yet has sufficient strength to withstand impacts of the snowmobile with a hard surface and the force experienced when the snowmobile is driven at high speed around corners. In a further aspect, the configuration of the spindle enables the spindle to handle greater loads compared to a typical spindle. In an additional aspect, the cross-sectional shape of the spindle enables the spindle to manage loads experienced during use. All measurements within the present disclosure related to full-size, adult snowmobiles. Youth size snowmobile measurements may be adjusted proportionally.

In at least one embodiment, a spindle 100 attached to the chassis/frame of a recreational vehicle is oriented so that the front and rear fins 134, 128 extend in a direction that is generally parallel to a direction of travel. For example, when the spindle 100 is attached to a snowmobile, the front and rear fins 134, 128 are oriented generally parallel to the long axis of the ski 410 (see e.g., FIGS. 6C-D).

In this example, the chassis/forward frame 440 includes a front suspension 400 and a handle 442. The front suspension 400 includes upper control arms 402 (e.g., A-arms), lower control arms 404 (e.g., A-arms), steering tie arms/rods 406, shock absorbers 408, and skis 410. In some embodiments, the front suspension 400 is connected to the forward frame 440 by at least one bracket or fastener (see e.g., a forward bracket 452 in FIG. 4A). For example, an upper control 402 may be coupled to the forward frame 440 by the forward bracket 452 and a rearward bracket 458, a lower control arm 404 may be coupled to the forward frame 440 by a forward bracket 456 and a rearward bracket 460, and a steering tie rod 406 may be coupled to the forward frame 440 by bracket 462.

In some embodiments, the spindle 100 is connected to the upper A-arm 402 by the upper control arm mount 108, to the lower A-arm 404 by the lower control arm mount 112, to the steering tie rod/arm 406 by the tie rod mount 114, and to the ski 410 by the ski mount 110. In a further embodiment, a shock absorber 408 is connected to the lower control arm mount 112 and/or lower A-arm 404 (see e.g., FIG. 5). When the spindle 100 is attached to the ski 410, the spindle 100 is oriented so that the ski mount hole 140 and the spine 118 are perpendicular to the long axis of the ski 410 (see e.g., FIGS. 5 and 6C-D).

In some embodiments, two spindles 100 are attached to the front suspension 400. In these embodiments, the two spindles 100 are mirror images (see e.g., FIG. 7A).

The steering axis may extend through the center of the ball of the ball joint of the upper control arm mount 108 and the center of the ball of the ball joint of the lower control arm mount 112. In some embodiments, the steering axis 116 extends at an oblique angle (see e.g., FIG. 6D—steering axis 116 is at an oblique angle to the longitudinal axis of the ski 410). In at least one embodiment, the majority of the front suspension 400 is positioned behind the lower control arm mount 112 of the spindle 100 (see e.g., line 172 representing an exemplary center of mass of spindle 100 in relation to line 116 in FIG. 6D and line 430 in FIG. 6E). In some embodiments, the bulk of the spindle material is located behind the front arm of the lower A-arm 404 (see e.g., FIGS. 4A and 10B). The angle of the steering axis 116 to a vertical line perpendicular to ground, the caster angle, may be 19-20°. In one aspect, a snowmobile utilized for trail raiding may have a caster angle of 9-20°.

As discussed above, the tie rod mount 114 may be positioned closer to spindle body 102 as compared to a typical spindle. Because the tie rod arm 406 is connected to the tie rod mount 114, the positioning of the tie rod mount 114 relative to the spindle body 102 may reduce the lever/moment of the tie rod arm 406 compared to a typical spindle.

When attached to a frame/suspension of a recreational vehicle, the spindle 100 experiences loads. The spine 118 manages a load along axis X of the hole 140 of the ski mount 110 (into the page) (see FIG. 1A). In some embodiments, the generally plus sign (+) cross-sectional shape reinforces the spindle 100 to manage the loads. In other embodiments, the spindle 100 is configured to position a sufficient amount of material/volume behind the steering axis 116 to better manage loads applied to the spindle 100. In some embodiments, a perpendicular distance of the tie rod mount 114 to line 170 is minimized to optimize the loads experienced by the spindle 100. In other words, as discussed above, the spine 118 is configured to position the tie rod mount 114 in close proximity thereto.

Figure 4A:
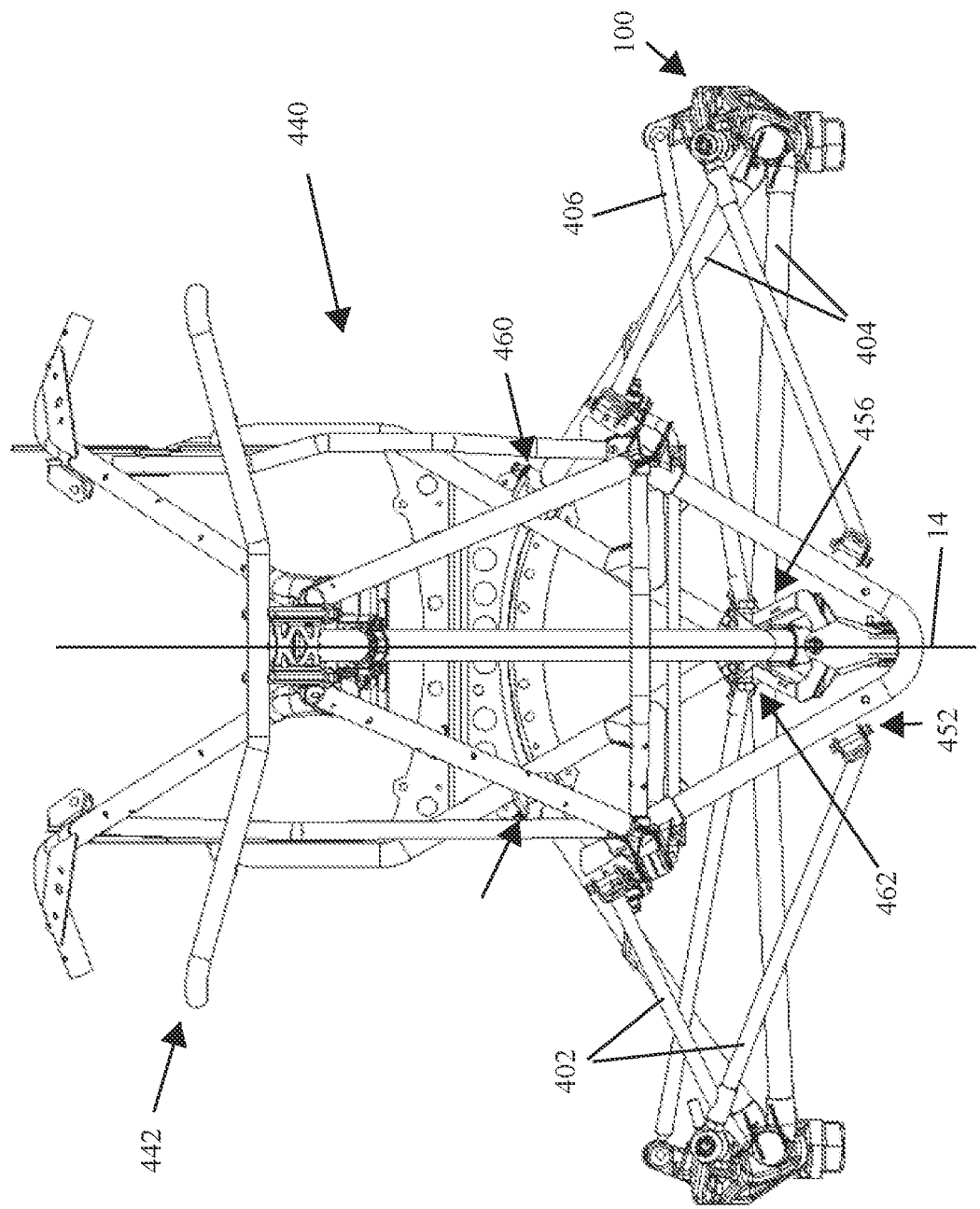
FIG. 4A is a top view of a frame portion with a spindle, according to some embodiments of this disclosure.
Figure 4B:
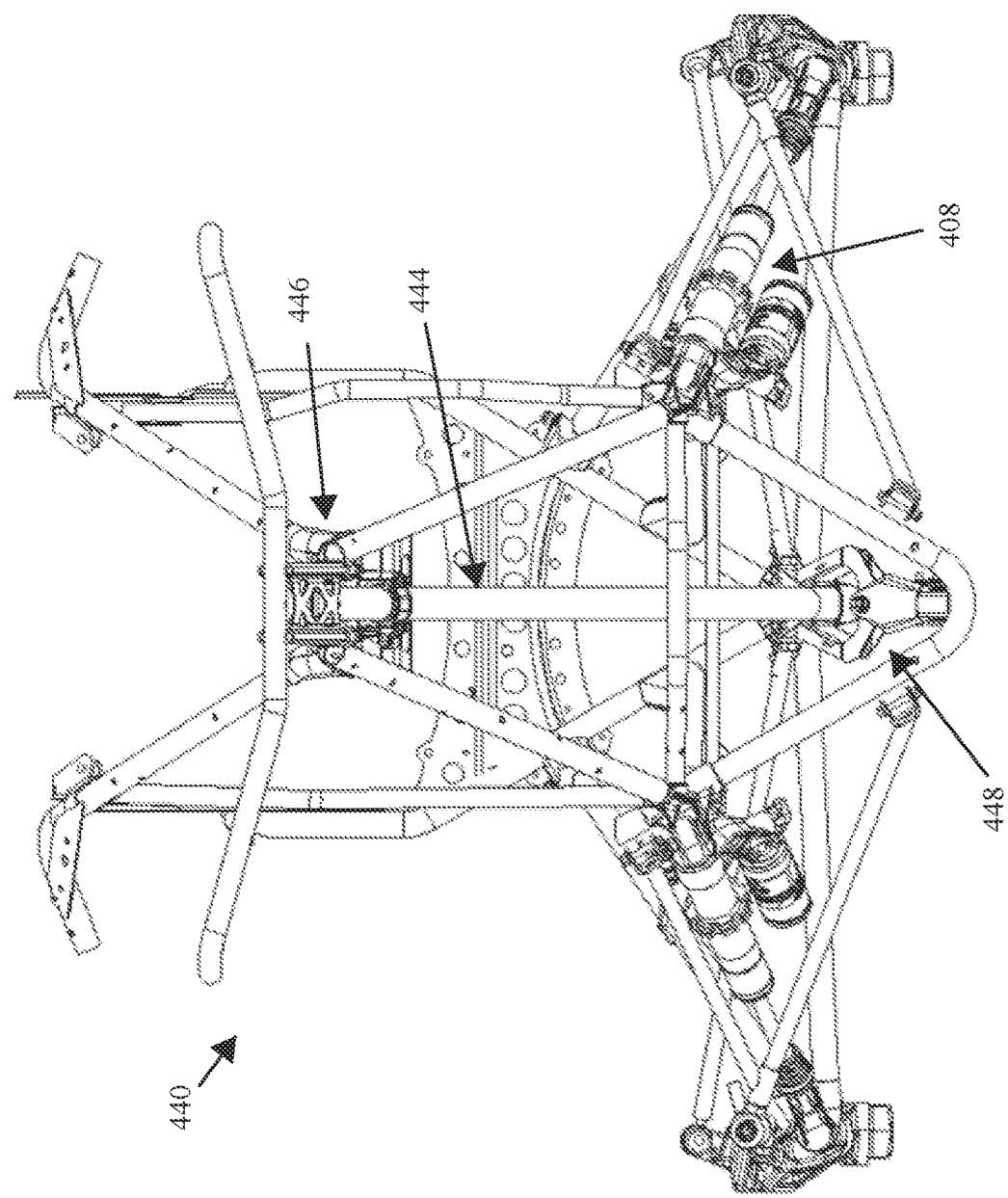
FIG. 4B is a top view of a frame portion with a spindle and a shock absorber, according to some embodiments of this disclosure.
Figure 4C:
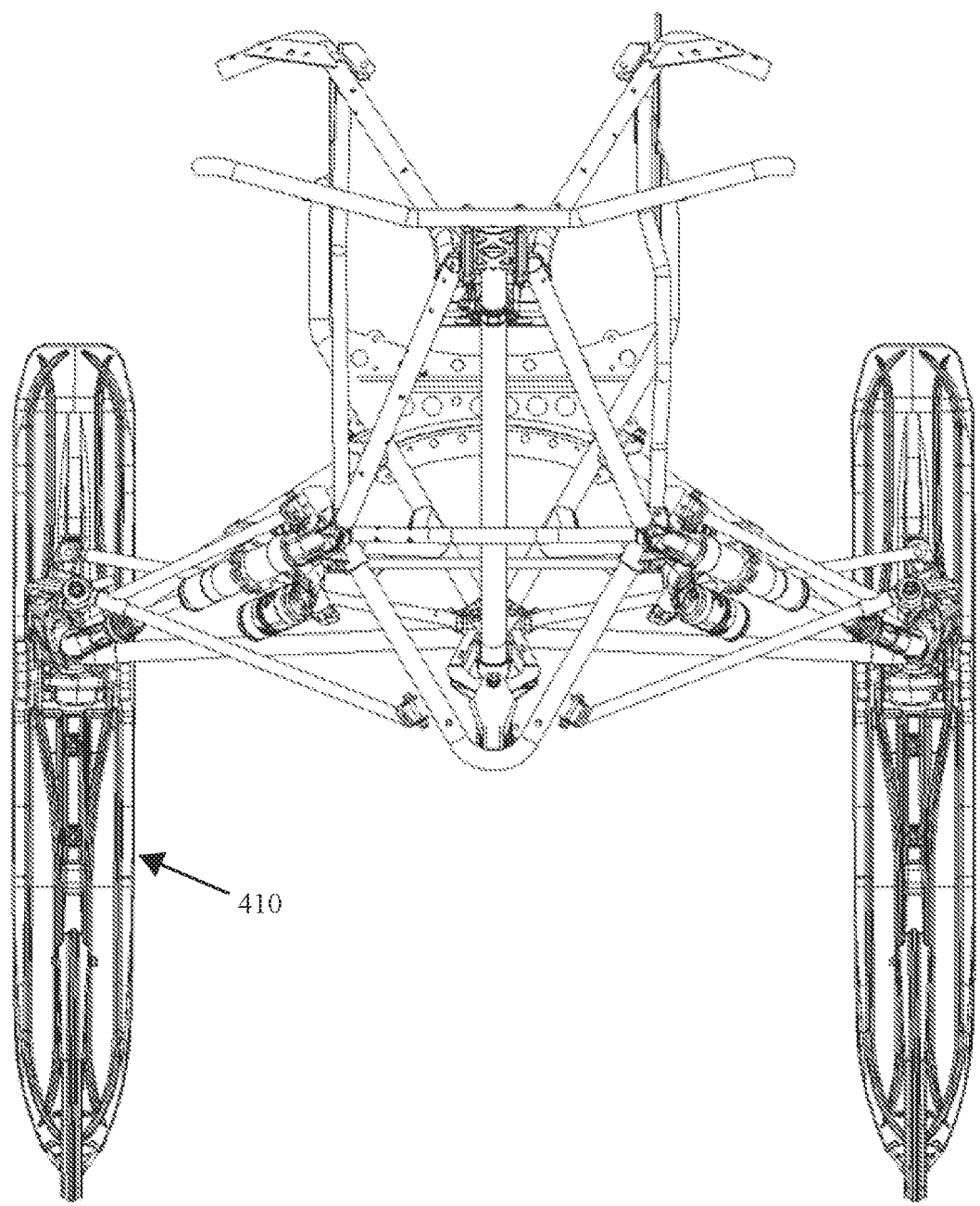
FIG. 4C is the top view of a frame portion with a spindle, a shock absorber, and a ski, according to some embodiments of this disclosure.
Figure 6A:
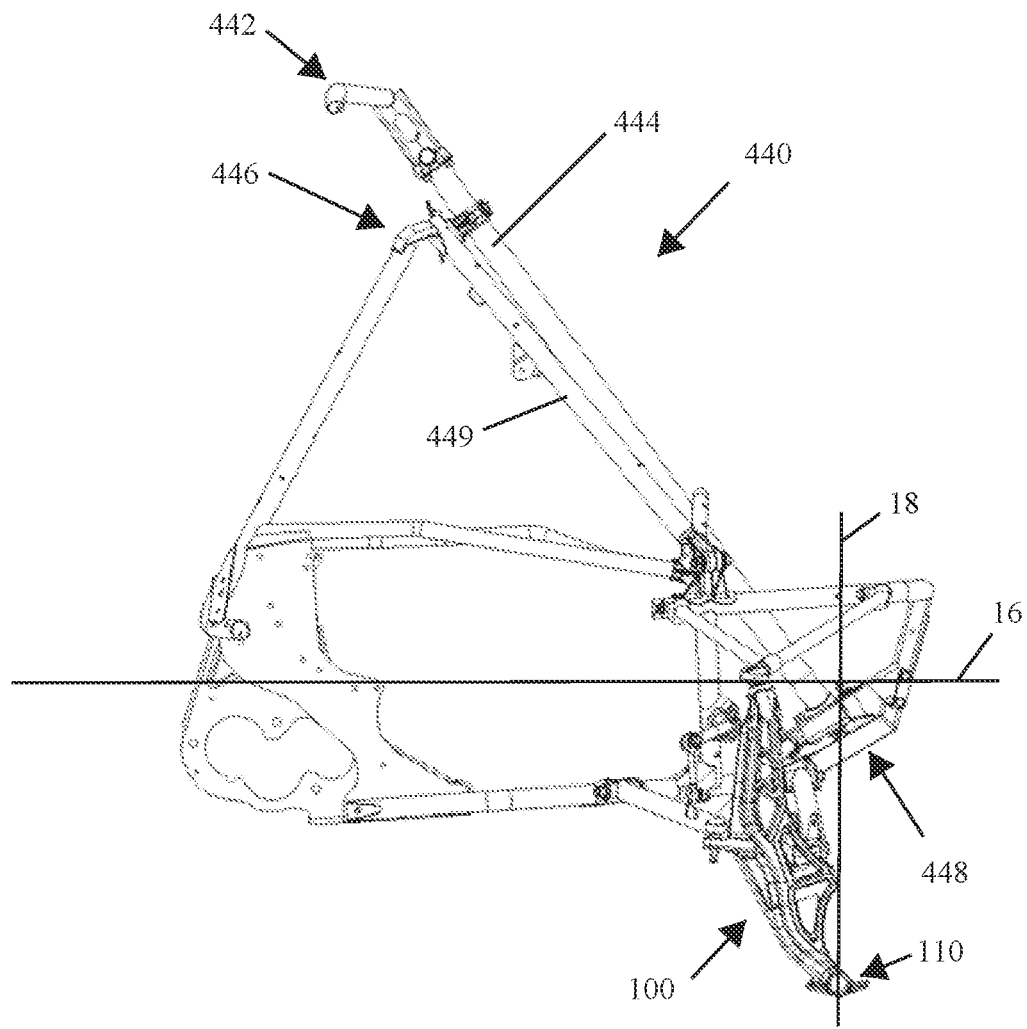
FIG. 6A is a side view of a frame portion with a spindle illustrating a portion of a frame without shocks or a ski, according to some embodiments of this disclosure.
Figure 6B:
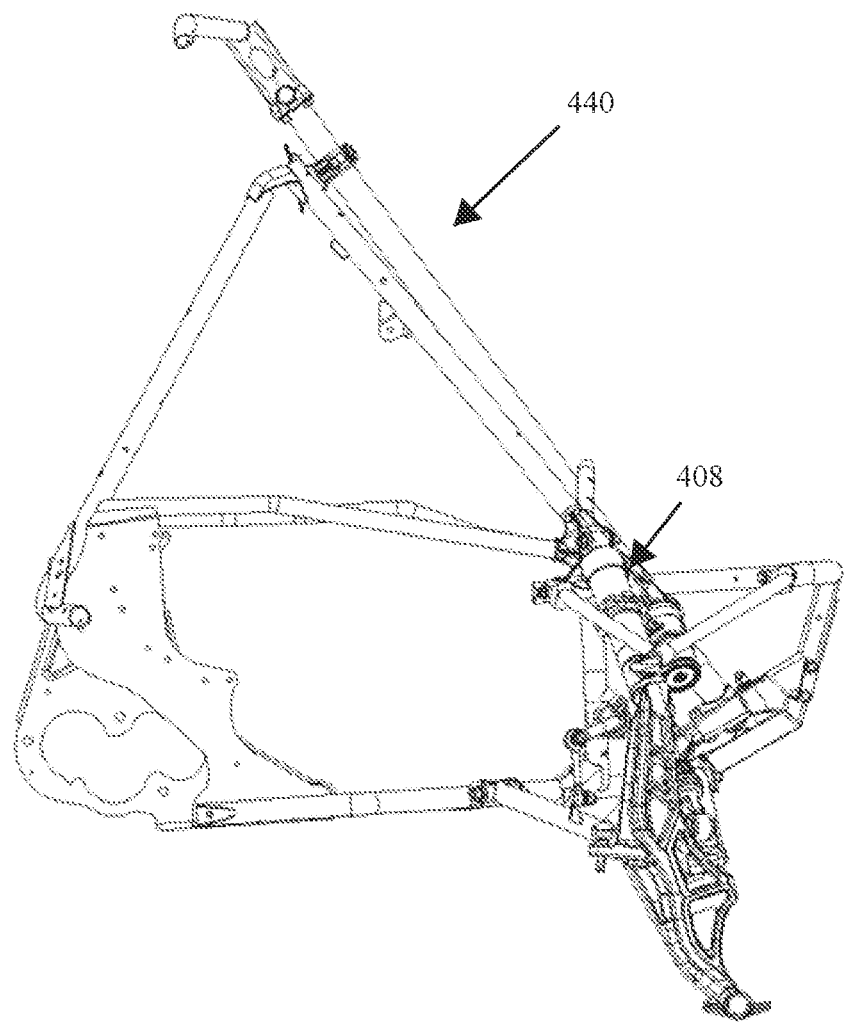
FIG. 6B is a side view of a frame portion with a spindle further showing the shock absorber, according to some embodiments of this disclosure.
Figure 6C:
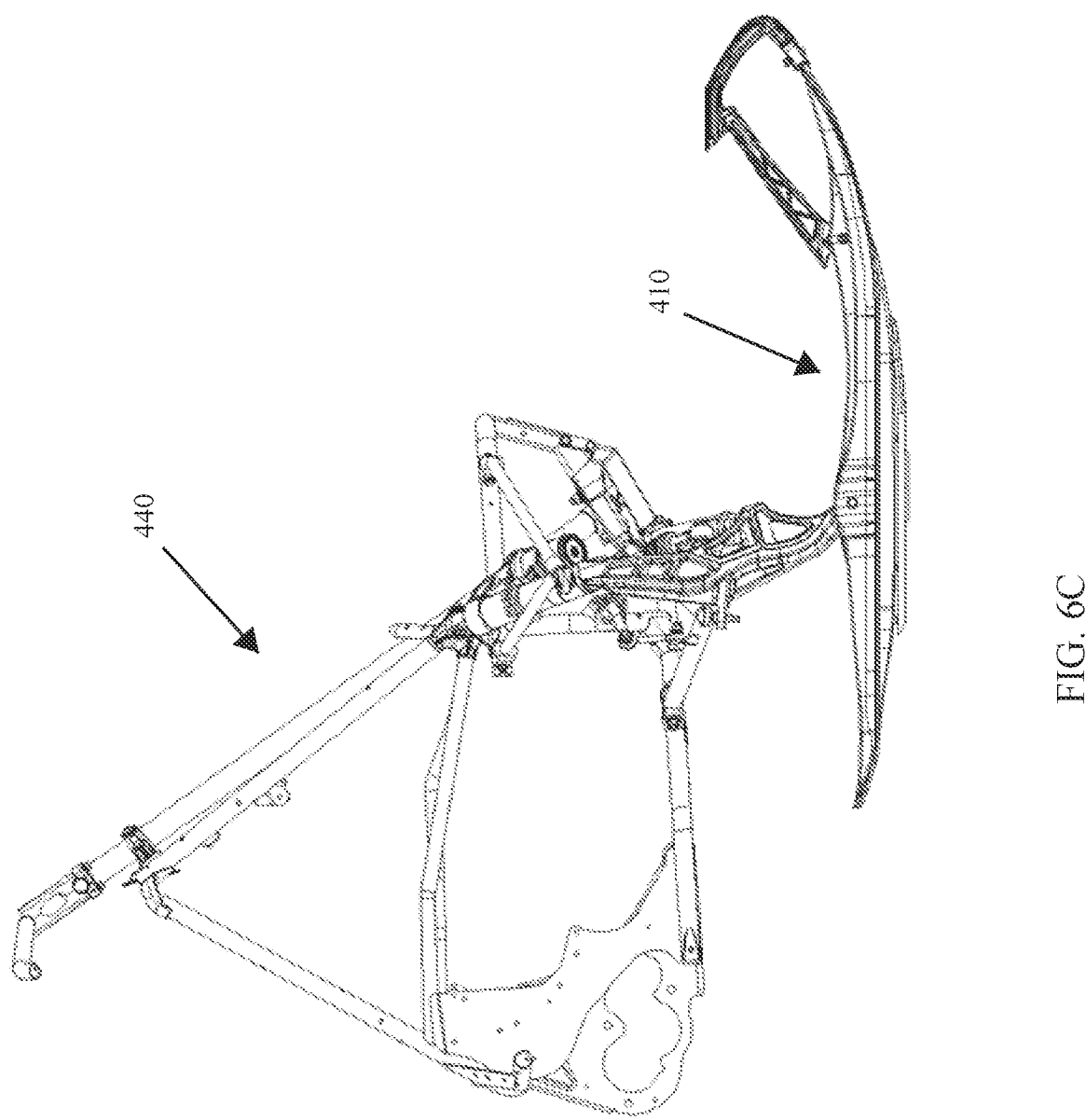
FIG. 6C is a side view of a frame portion with a spindle further showing the ski, according to some embodiments of this disclosure.
Figure 6D:
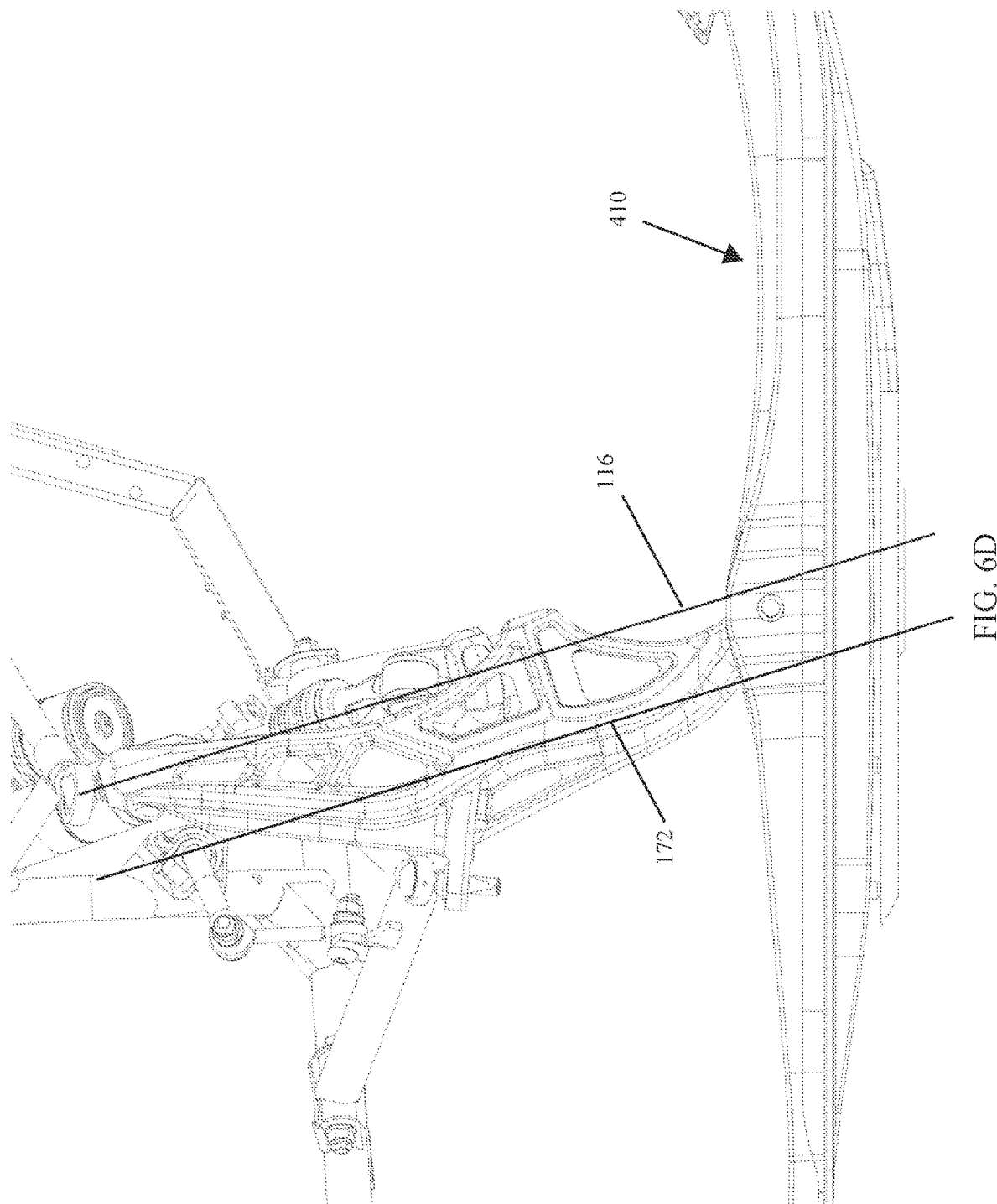
FIG. 6D is an enlarged side view of a frame portion with a spindle further showing the ski, according to some embodiments of this disclosure.
Figure 6E:
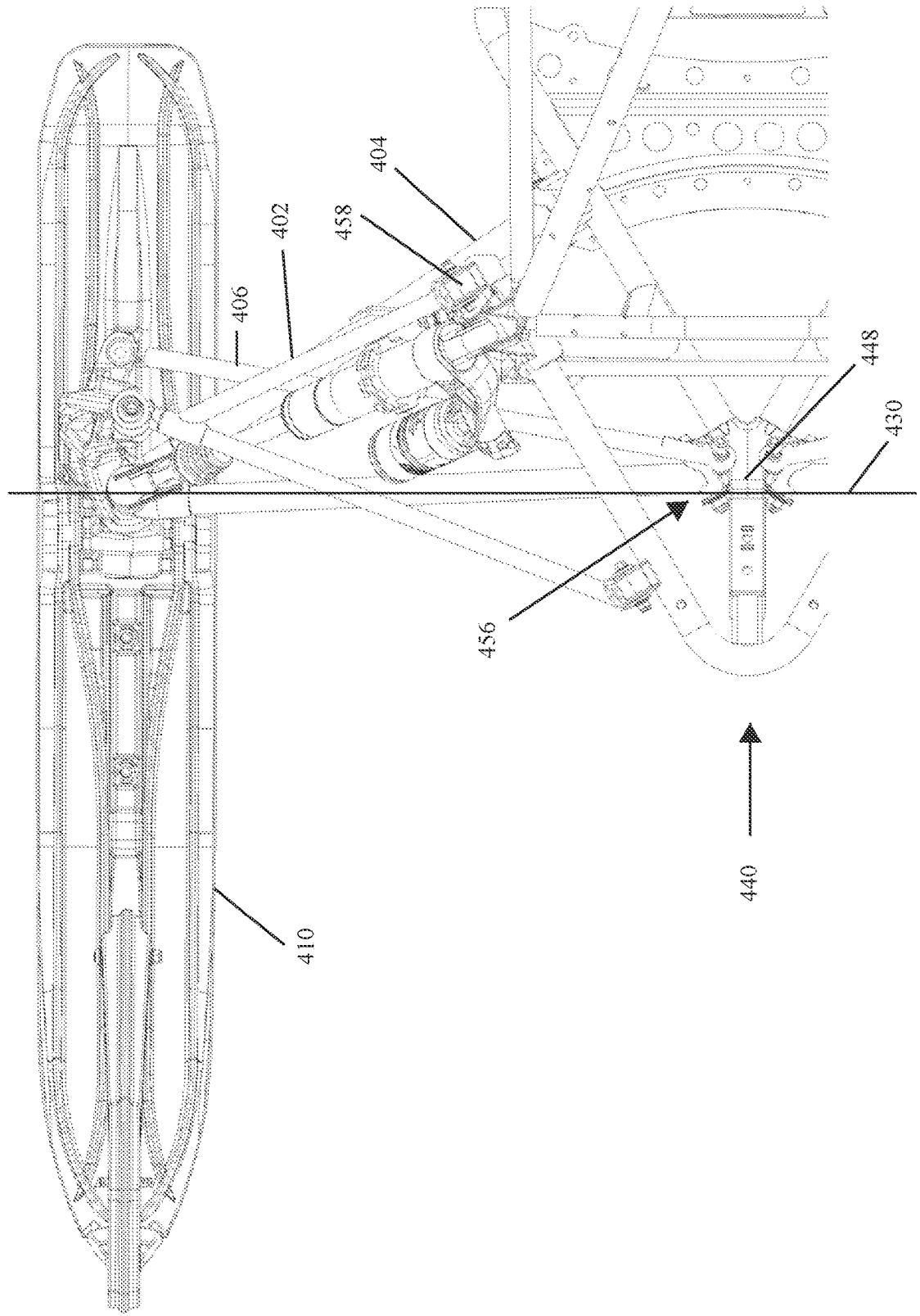
FIG. 6E is perspective top view of a frame portion with a spindle further showing the ski, according to some embodiments of this disclosure.
Figure 7A:
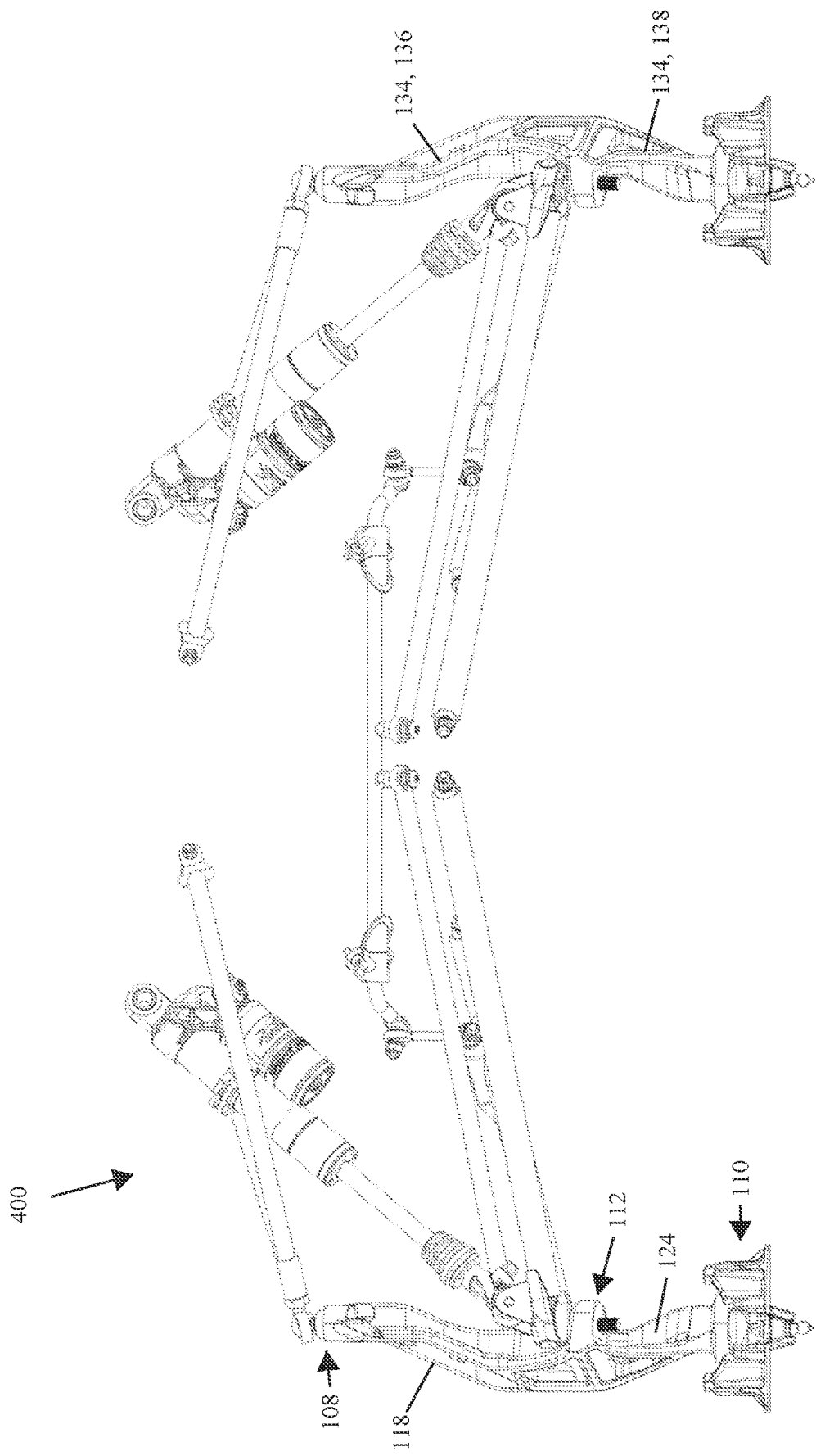
FIG. 7A is a front view of a spindle and suspension system, according to some embodiments of this disclosure.
Figure 7B:
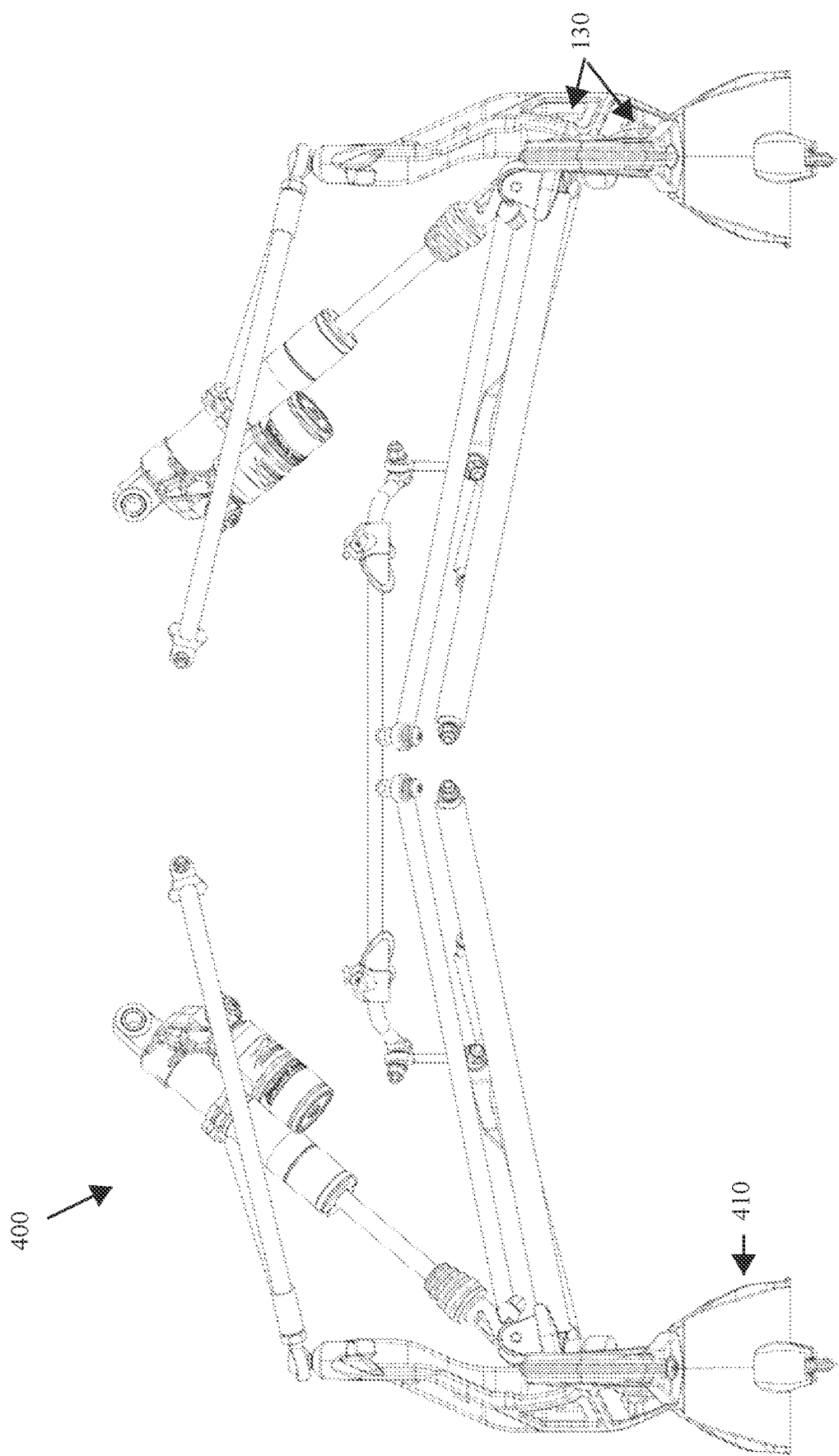
FIG. 7B is a front view of a spindle and suspension system, according to some embodiments of this disclosure.
Figure 7C:
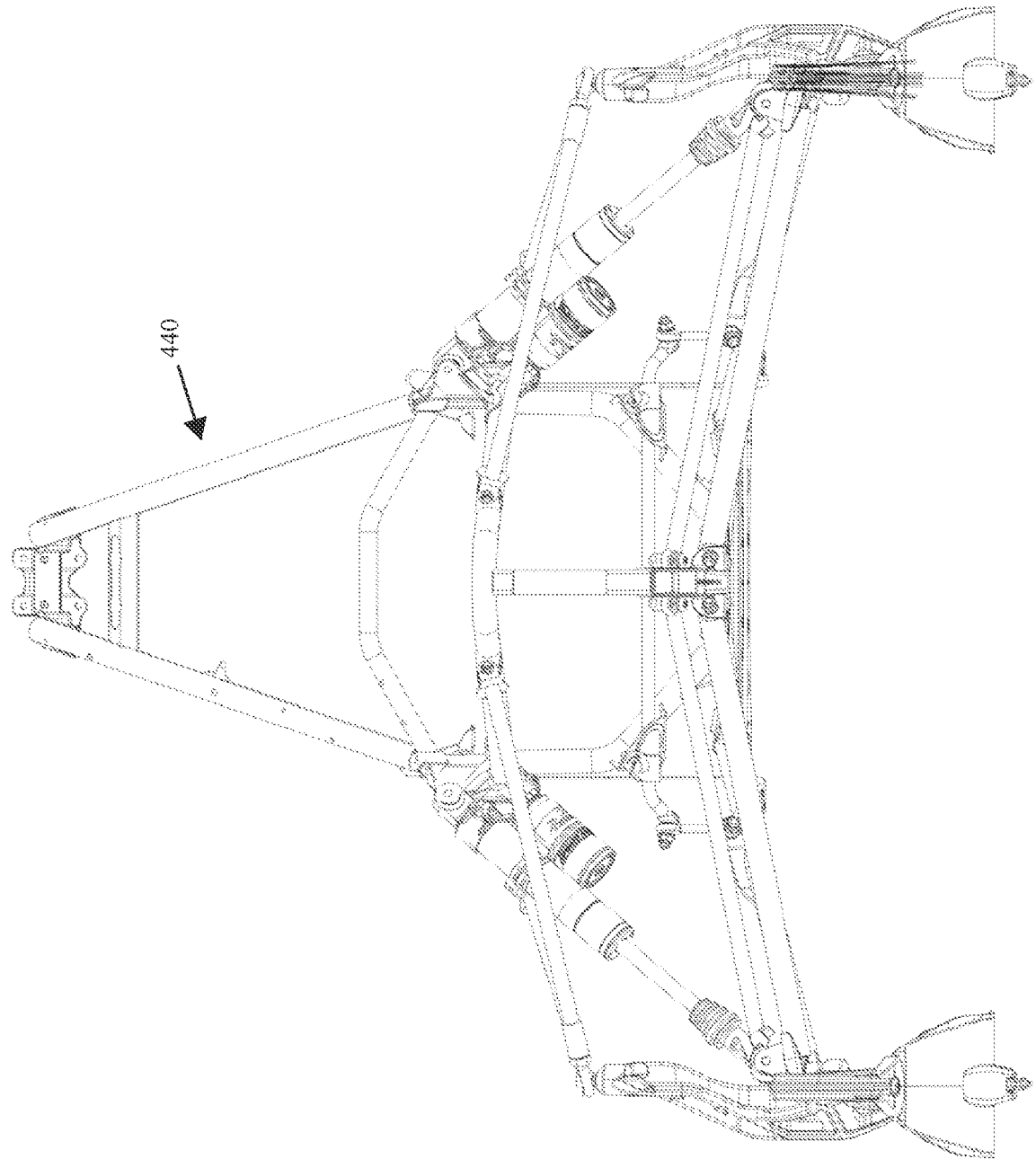
FIG. 7C is a front view of a spindle and suspension system, according to some embodiments of this disclosure.
Figure 8A:
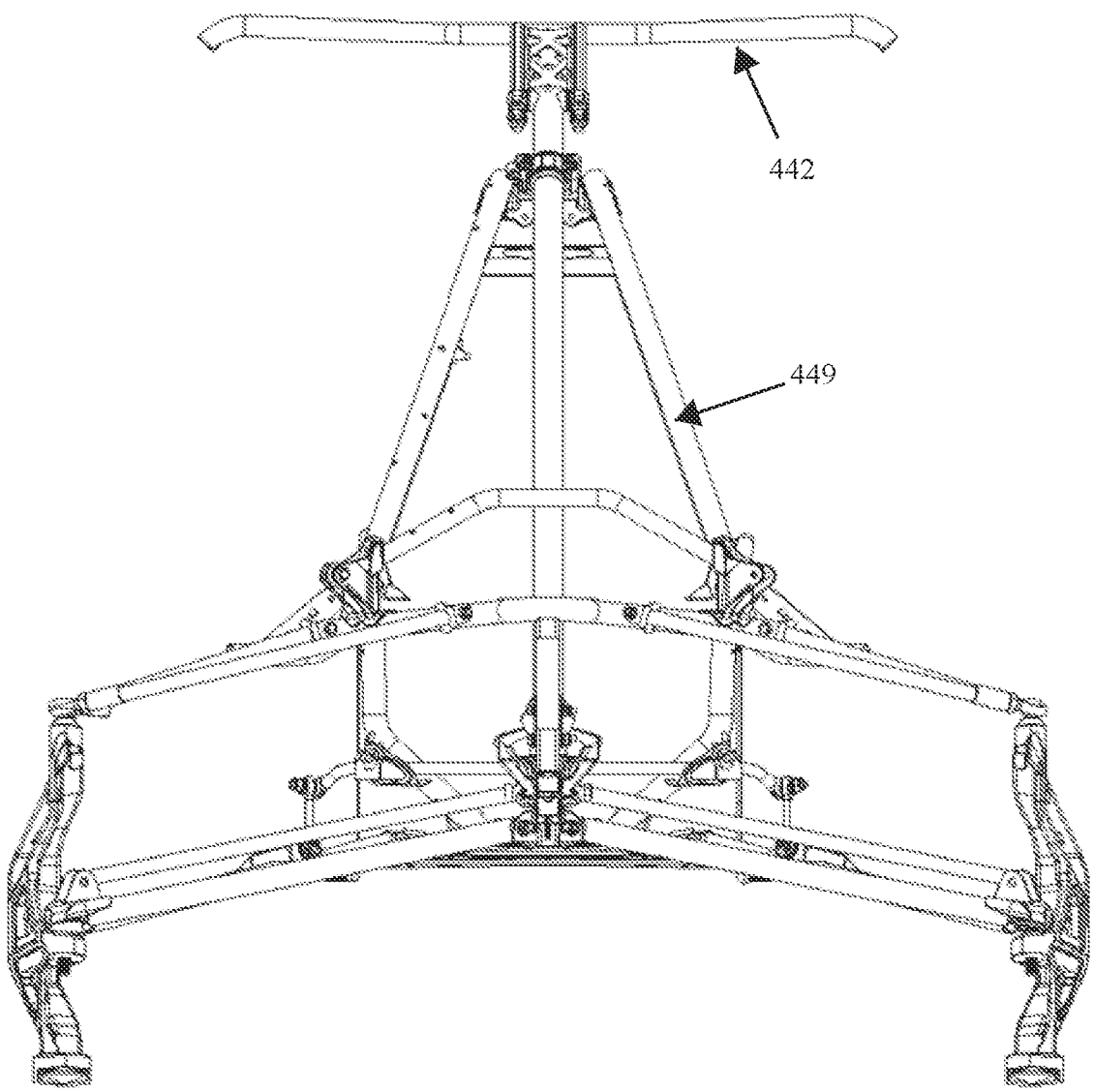
FIG. 8A is a front view of a spindle and frame, according to some embodiments of this disclosure.
Figure 8B:
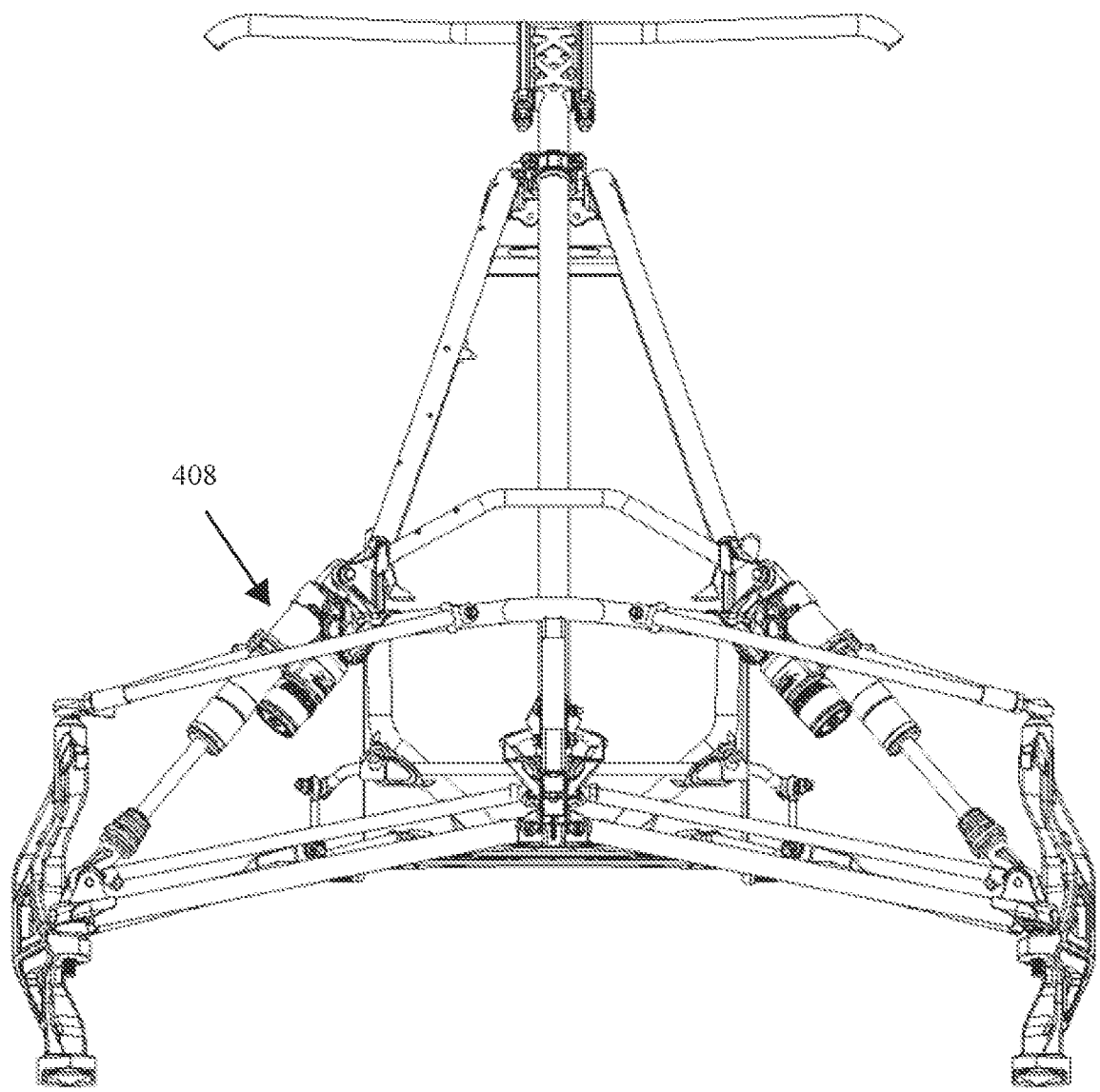
FIG. 8B is a front view of a spindle and frame, according to some embodiments of this disclosure.
Figure 8C:
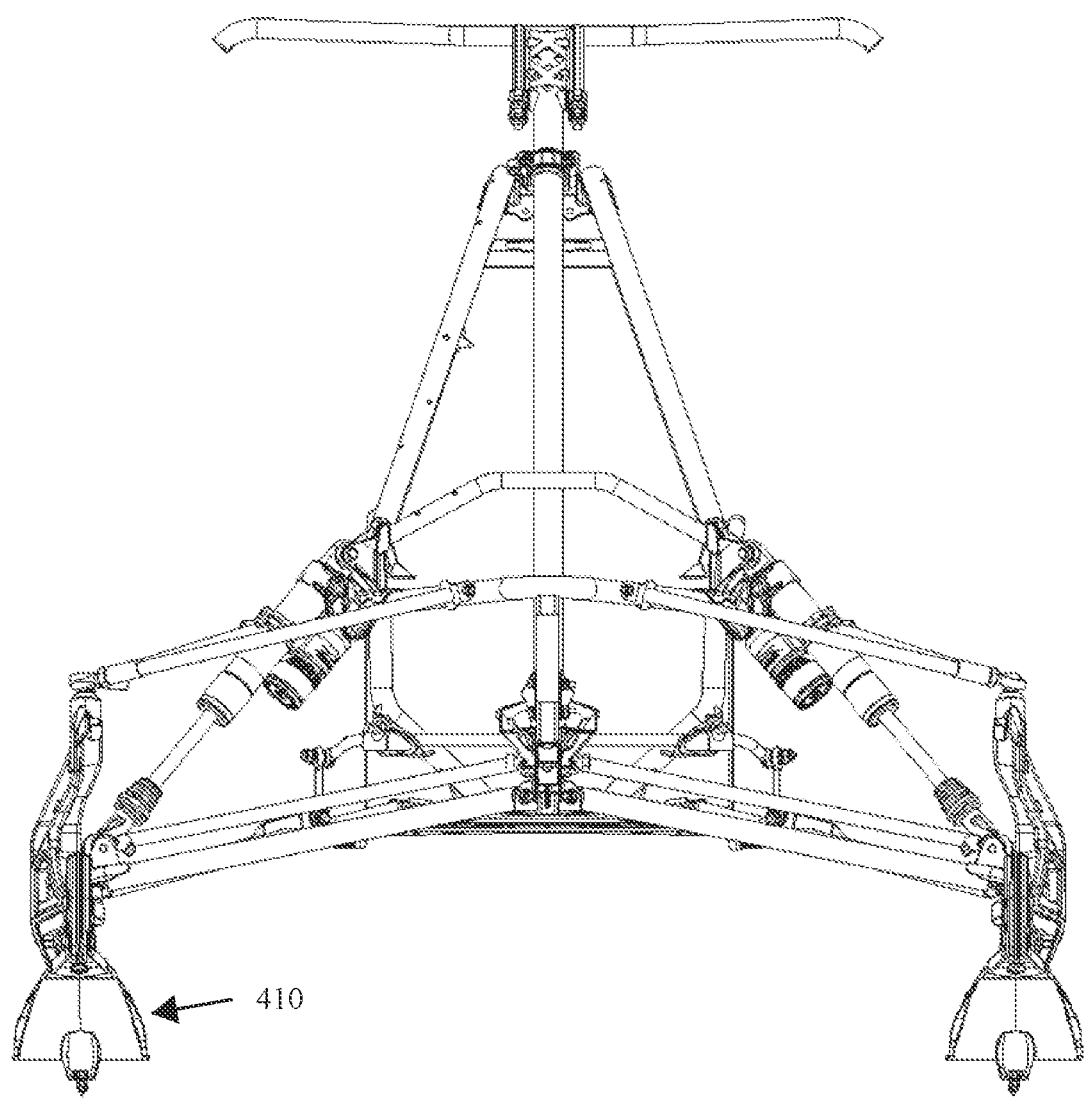
FIG. 8C is a front view of a spindle and frame, according to some embodiments of this disclosure.
Figure 9:
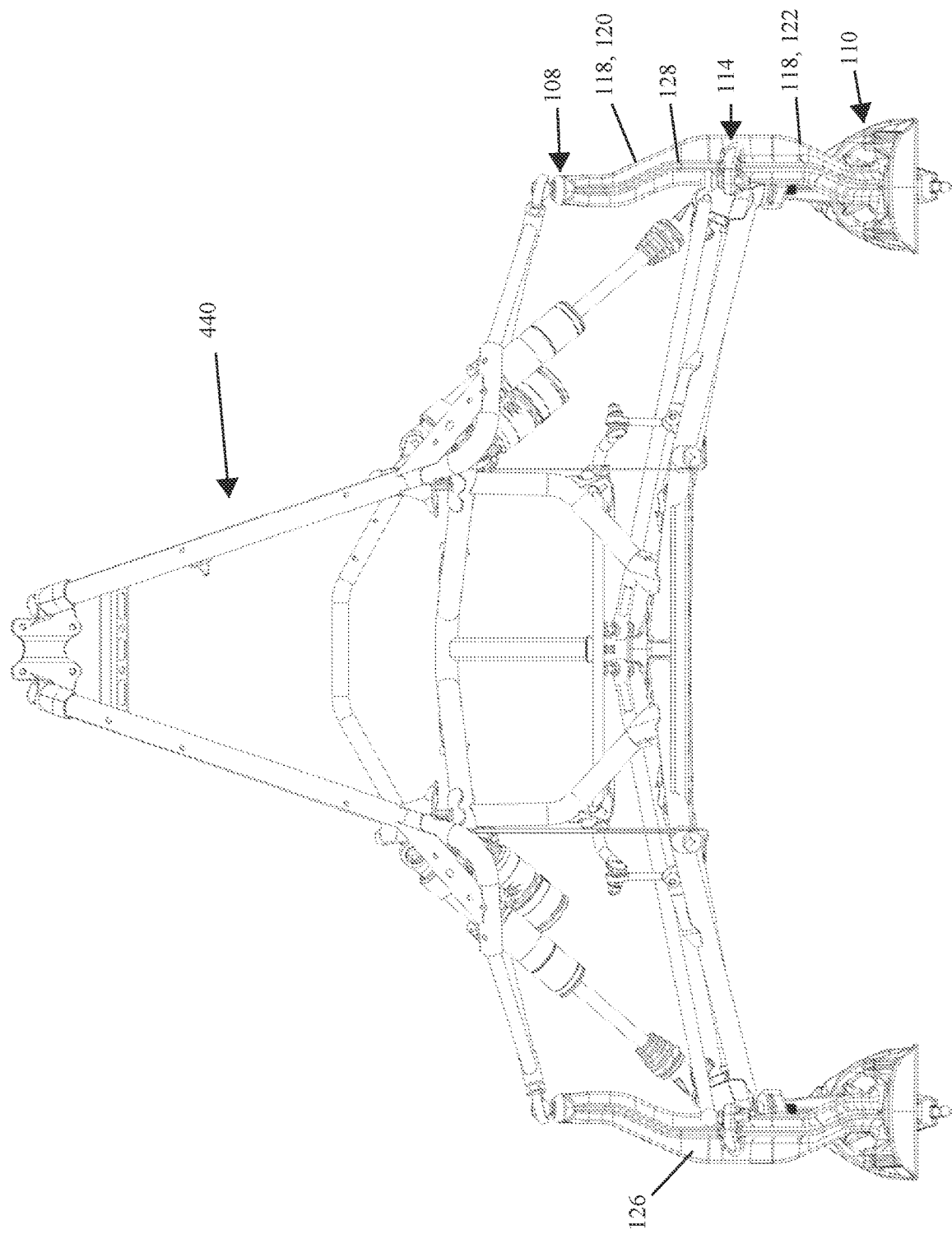
FIG. 9 is a perspective back view of the spindle, suspension system, and chassis, according to some embodiments of this disclosure.
Figure 10A:
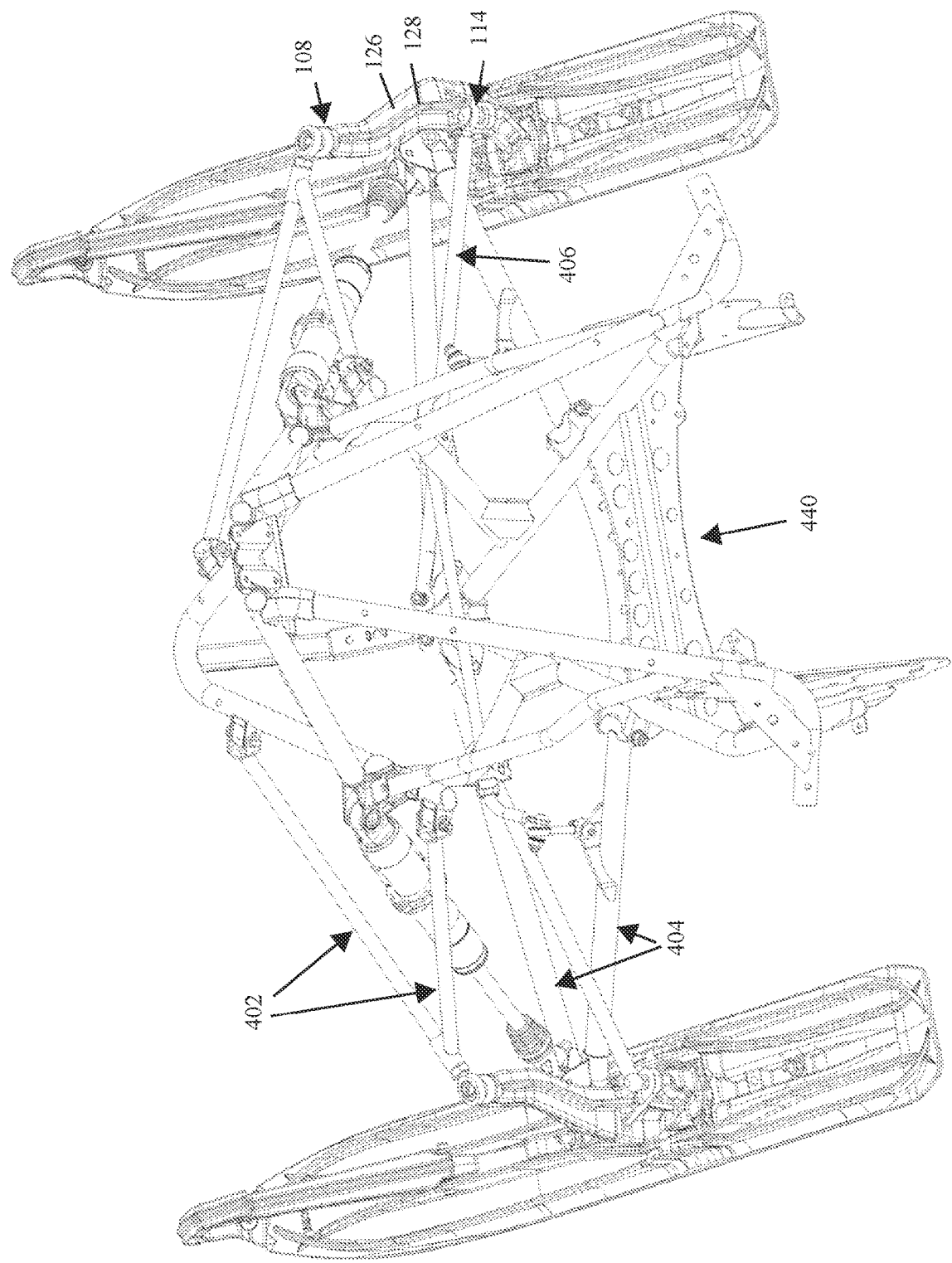
FIG. 10A is a perspective rear top view of the spindle, suspension system, and chassis, according to some embodiments of this disclosure.
Figure 10B:
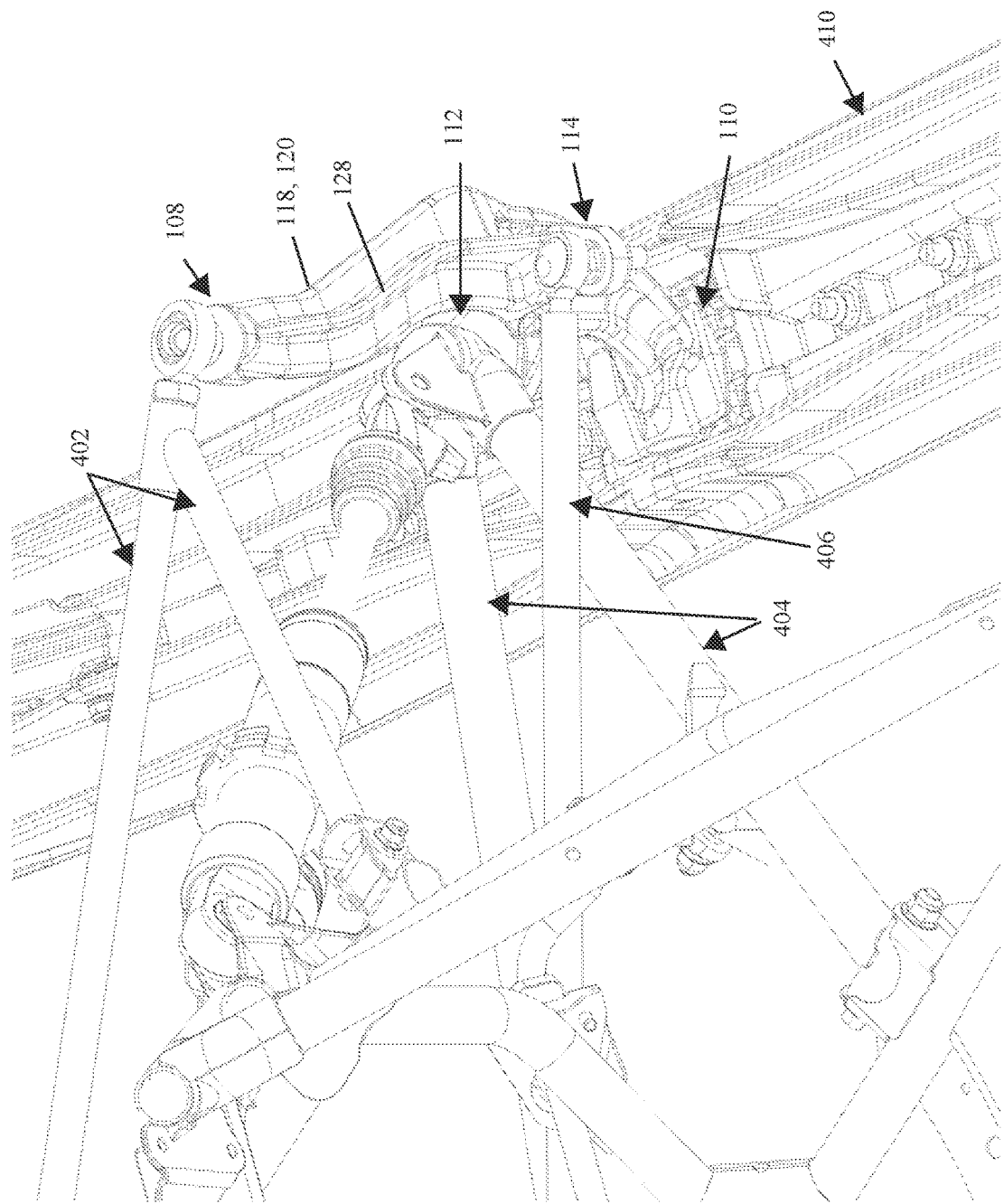
FIG. 10B is a rear inside view of the spindle, suspension system, and chassis, according to some embodiments of this disclosure.

In an embodiment as shown in FIG. 6A a steering column 444 may have a first end positioned at steering column mount 446 adjacent the top of the forward frame 440, and a second end that extends to a lower mount 448 positioned at a forward end of the forward frame 440 (see also, FIG. 4B). Optionally, the steering column 444 is positioned at least partially forward of a frame member 449 that extends forward and downward from the steering column mount 446 (see e.g., FIG. 6A). Optionally, the second end of the steering column 444 is positioned lower than the upper control arm mount 108 (see line 16). In some embodiments, the lower mount 448 and the ski mount 110 are aligned (see line 18). In additional embodiments, when the frame is viewed from the side (see FIG. 6A) the entire steering column 444 extends above the spindle 100, including the upper control arm mount 108. The steering column may be positioned entirely rearward of the line 18 running through the center of opening 140 of the ski mount 110. The second end of the steering column 444 is positioned forward of the forward mount 452 of the forward arm of the lower A-arm 404 along the longitudinal centerline 14 of the forward frame 440 (see e.g., FIG. 4A). Optionally, the skis are separated by 39 to 43 inches.

In some implementations, a snowmobile includes a stand-alone forward frame 440, a spindle 100, an upper control arm 402, a lower control arm 404, and a steering column 444. The standalone forward frame 440 includes a front, a rear, and a forward frame member 449 including a first end positioned between the front and the rear, and a second end extending upwardly and rearwardly to a steering column mount 446. The spindle 100 includes the upper end 101 and the bottom end 103, wherein the bottom end 103 is securable to a ski 410 (e.g., ski mount 110). The upper control arm 402 is secured to the upper end 101 of the spindle 100 and the frame 440. The lower control arm 404 is secured to the spindle 100 and the frame 440. The steering column 444 has a length extending from a first end positioned adjacent the steering column mount 446 to a second end operably connected to the front of the frame 440 forward along a longitudinal centerline 14 of the forward frame 440 and forward of at least a portion of the spindle 100, wherein the steering column 444 extends entirely over the upper end 101 of the spindle 100 when viewed from the side of the forward frame 440. The lower control arm 404 includes a forward mount 456 on the frame 440. Optionally, the second end of the steering column 444 is positioned forward of the forward mount 456 along the longitudinal centerline 14 of the forward frame 440 (see e.g., FIG. 6A). Optionally, the second end of the steering column 444 is positioned lower than the upper end 101 of the spindle 100 (see e.g., line 16 of FIG. 6A).

Figure 11:
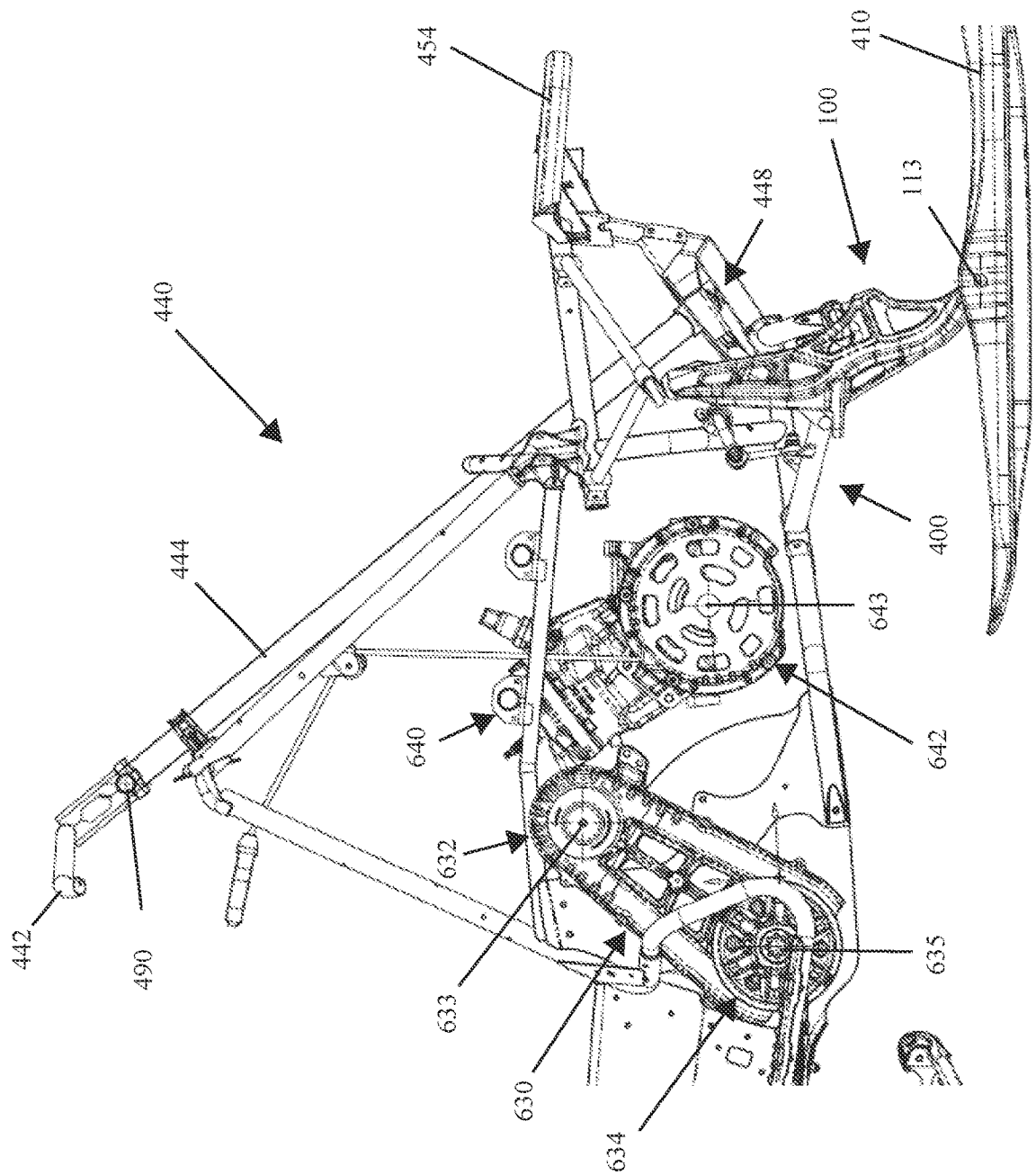
FIG. 11 is an enlarged view of a section of a snowmobile, according to some embodiments.

FIG. 11 is an enlarged side view illustrating a section of a snowmobile according to some embodiments. As discussed above, the snowmobile includes a forward frame 440 with a steering column 444 and a front suspension 400 coupled to the forward frame 440. The forward frame assembly 440 may further include a front bumper 454. FIGS. 12-16 illustrate examples of a common forward frame 440 utilized for snowmobiles 700, 701, 702, 703, 704 that may be configured for different terrains and/or uses, such as trail riding and/or mountain riding. The track of each snowmobile 700, 701, 702, 703, 704 is removed for viewing purposes. The suspension of each in FIGS. 11-16 is in a fully extended state and the skis are directed forward.

The snowmobile 700, 701, 702, 703, 704 may further include a skid frame assembly 600, a rear suspension assembly 612, a belt housing assembly 630, and an engine assembly 640. The skid frame assembly 600 supports an endless track (not shown) and includes one or more idler wheels 602, 604 (see e.g., FIGS. 12-16). The idler wheels 602, 604 may be positioned rearward of the front frame assembly 440. In one example, the skid frame assembly 600 includes an upper idler wheel 602 and a plurality of lower idler 604 wheels that may be coupled to a skid rail 606. The upper idler wheel 602 may be positioned between a rear lower idler wheel 604 and a pair of front lower idler wheels 604. The upper idler wheel 602 may be coupled via an attachment point 610 which may be an aperture in a support member 608. In one example, the plurality of lower idler wheels 604 is three lower idler wheels 604a-c (see e.g., FIG. 12). In other example, the plurality of lower idler wheels 604 is two idler wheels 604d-e (see e.g., FIG. 15). Each idler wheel 602, 604 has a diameter. The rear lower idler wheel 604a, 604d may have a smaller diameter than the front lower idler wheels 604b-c, 604e. The rear suspension assembly 612 includes a rear suspension arm 614. The forward end of the rear suspension arm 614 may be attached to the tunnel 500 at point 616. The rearward end of the rear suspension arm 614 may be attached to the skid frame assembly 600 at attachment point 618. One or more additional components may also be interconnected at point 618. The belt housing assembly 630 is operably connected to a track drive shaft. The belt housing assembly 630 may comprise the belt housing assembly disclosed in co-pending U.S. patent application Ser. No. 17/588,487 filed on Jan. 31, 2022 and titled "Adjustable Belt Drive Assembly, System and Method," the contents of which are incorporated by reference in its entirety. In a non-limiting example, the belt housing assembly 630 includes a top drive sprocket 632 operably connected to the engine assembly 640, and a bottom drive sprocket 634 operably connected to the track drive shaft. The engine assembly 640 includes a recoil housing 642. The position of a rider on the snowmobile 700, 701, 702, 703 is approximated by a reference point 490 defining the uppermost fixed point of the steering column 444.

Distances D1-D18 and H1-H17 represent distances measured when the shocks are at full maximum length (i.e., full suspension). D1-D18 are distances measured along the longitudinal axis 21 of the snowmobile 700, 701, 702, 703, 704 to the reference point 490. H1-H17 are distances measured by a line perpendicular to the ground. In one aspect, the engine is lower compared to the position of the engine in a typical snowmobile. In another aspect, the engine and/or ski is closer to the rider compared to a typical snowmobile. In a further aspect, skis positioned closer to the rider provides for a more responsive snowmobile.

The centerpoint 635 of the bottom drive sprocket 634 is positioned rearward of reference point 490 by a distance D1, D8 of approximately 26-39% of the distance D4, D11. In some embodiments, distance D1 may be approximately 28-36% of the distance D4 (see e.g., FIGS. 12-13). In other embodiments, distance D8 may be approximately 27-35% the of distance D11 (see e.g., FIGS. 14-15). The centerpoint 635 is the location of the axis of rotation of the track drive shaft and may be referred to as such.

The centerpoint 633 of the top drive sprocket 632 is positioned rearward of reference point 490 by a distance D2, D9 of approximately 5-10% of the distance D4, D11. In some embodiments, distance D2 may be approximately 6-9% of the distance D4 (see e.g., FIGS. 12-13). In other embodiments, distance D9 may be approximately 5-9% of the distance D11 (see e.g., FIGS. 14-15).

The crankshaft axis of rotation 643 of the engine assembly 640 is positioned forward of reference point 490 by a distance D3, D6, D10, D13 of approximately 30-40% of the distance D4. In some embodiments, distance D3 may be approximately 32-37% of the distance D4 (see e.g., FIG. 12). In other embodiments, distance D6 may be approximately 33-38% of the distance D4 (see e.g., FIG. 13). In additional embodiments, distance D10 may be approximately 33-38% of the distance D4 (see e.g., FIG. 14). In further embodiments, distance D13 may be approximately 32-37% of the distance D4 (see e.g., FIG. 15).

The centerpoint 113, positioned on axis X, of the ski mount 110 is positioned forward of reference point 490 by a distance D4, D11. Distance D4, D11 may be shorter than for a typical snowmobile. A smaller value for distance D4, D11 positions the front suspension 400 and/or engine closer to the rider which may provide for a more responsive ride.

The crankshaft axis of rotation 643 of the engine assembly 640 is positioned rearward of the centerpoint 113 of the ski mount 110 by a distance D5, D7, D12, D14 of approximately 58-80% of the distance D4, D11, and optionally 60-70% of the distance D4, D11. In some embodiments, distance D5 is approximately 63-68% of the distance D4 (see e.g., FIG. 12). In other embodiments, distance D7 is approximately 62-67% of the distance D4 (see e.g., FIG. 13). In additional embodiments, distance D12 is approximately 62-67% of the distance D11 (see e.g., FIG. 14). In further embodiments, distance D14 is approximately 63-68% of the distance D11 (see e.g., FIG. 15).

The centerpoint 635 of the bottom drive sprocket 634 is positioned rearward of the centerpoint 633 of the top drive sprocket 632 by a distance, e.g., D1−D2. The centerpoint 635 of the bottom drive sprocket 634 is positioned rearward the crankshaft axis of rotation 643 of the engine assembly 640 by a distance, e.g., D1+D3. The centerpoint 635 of the bottom drive sprocket 634 is positioned rearward of the centerpoint 113 of the ski mount 110 by a distance, e.g., D1+D4. The centerpoint 633 of the top drive sprocket 632 is positioned rearward of the crankshaft axis of rotation 643 of the engine assembly 640 by a distance, e.g., D2+D3. The centerpoint 633 of the top drive sprocket 632 is positioned rearward of the centerpoint 113 of the ski mount 110 by a distance, e.g., D2+D4. The crankshaft axis of rotation 643 of the engine assembly 640 is positioned rearward of the centerpoint 113 of the ski mount 110 by a distance, e.g., D4−D3.

Figure 12:
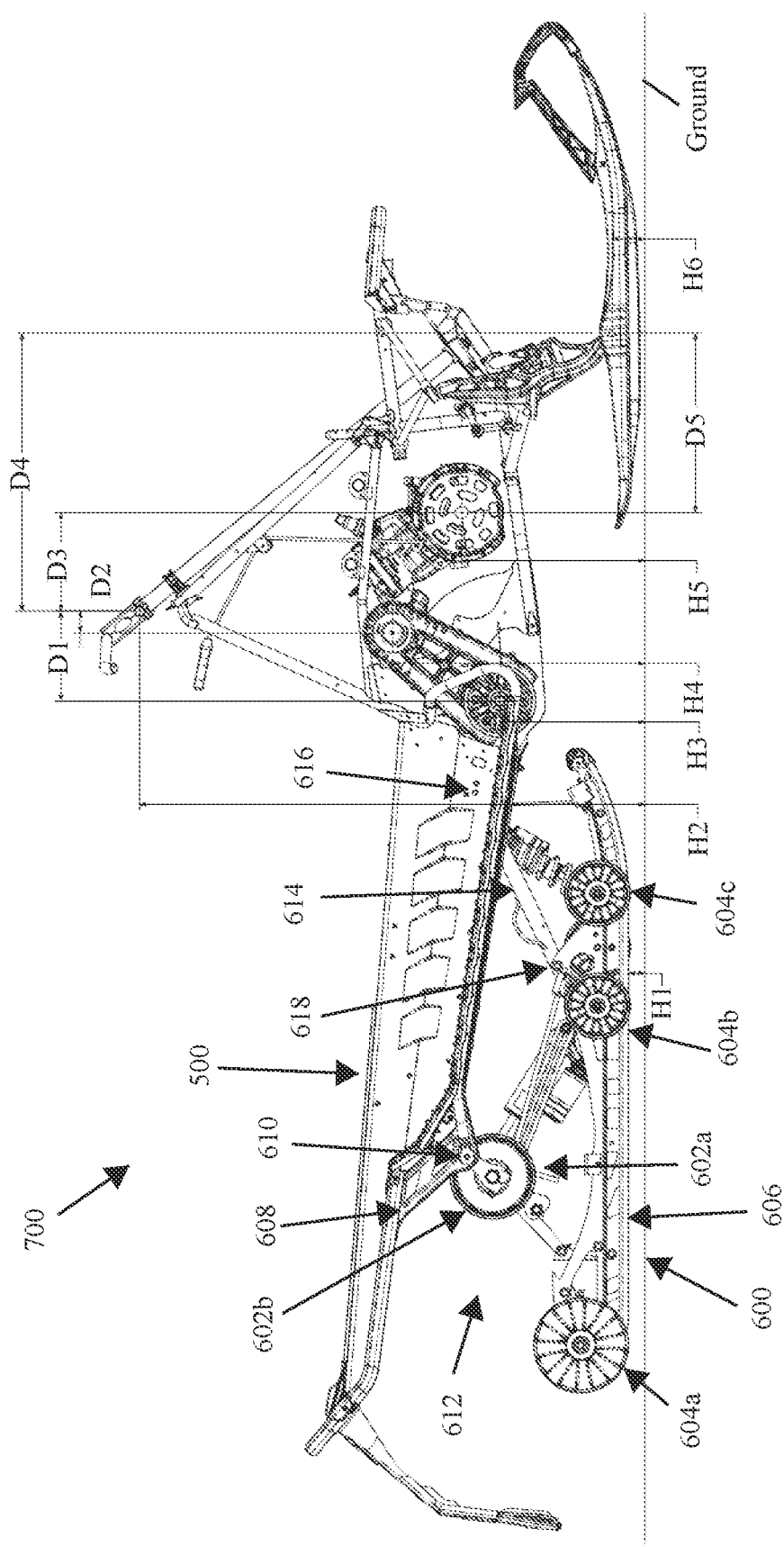
FIG. 12 is a side view of an embodiment of a snowmobile, according to some embodiments.

In one example, D2 is approximately 5-10% of D4, D1 is approximately 29-39% of D4, D3 is approximately 30-40% of D4, and D5 is approximately 60-70% of D4 (see e.g., FIG. 12). In another example, D2 is approximately 6-9% of D4, D1 is approximately 28-35% of D4, D6 is approximately 31-38% of D4, and D7 is approximately 62-67% of D4 (see e.g., FIG. 13).

Figure 14:
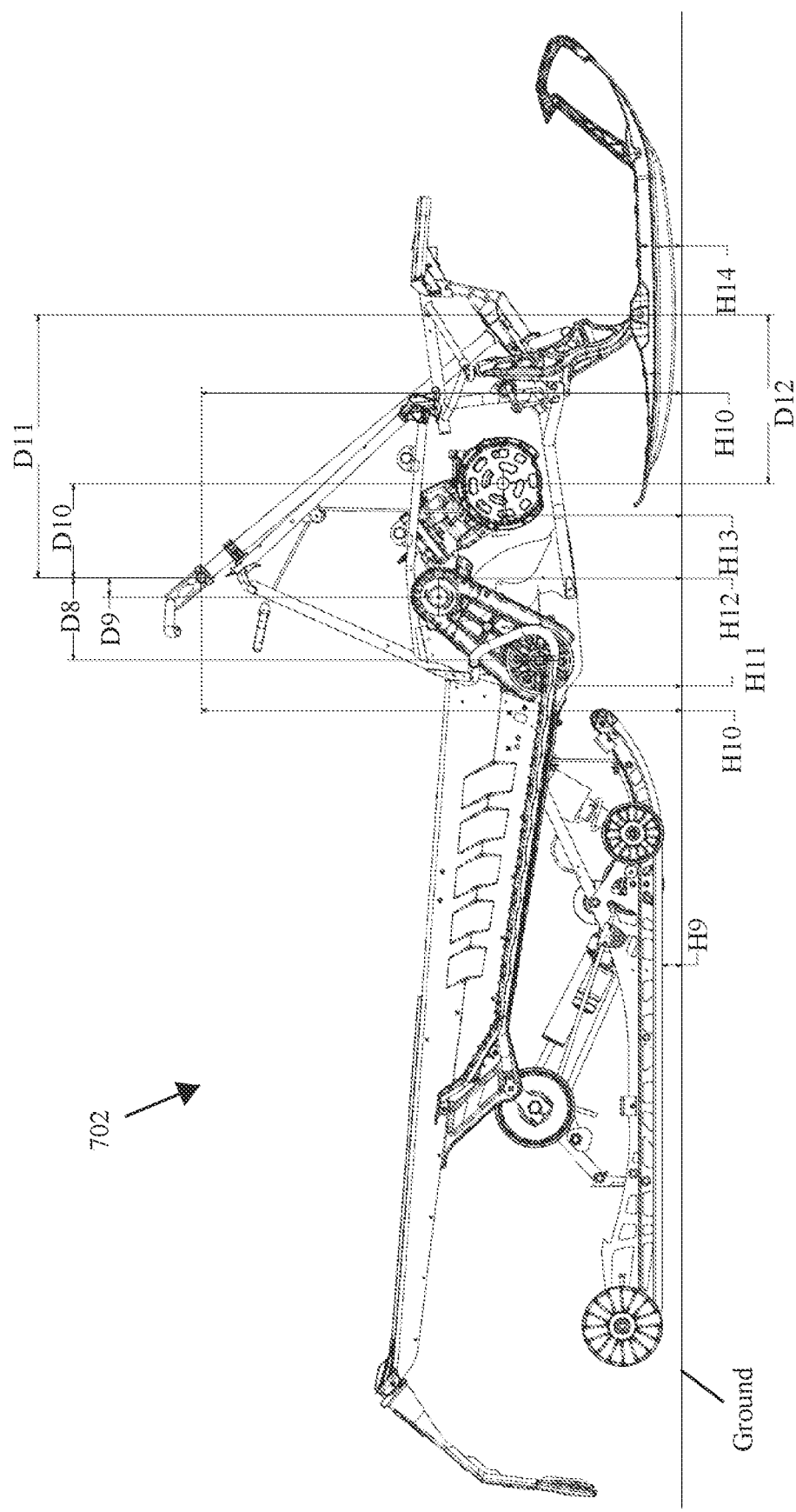
FIG. 14 is a side view of an embodiment of a snowmobile, according to some embodiments.
Figure 15:
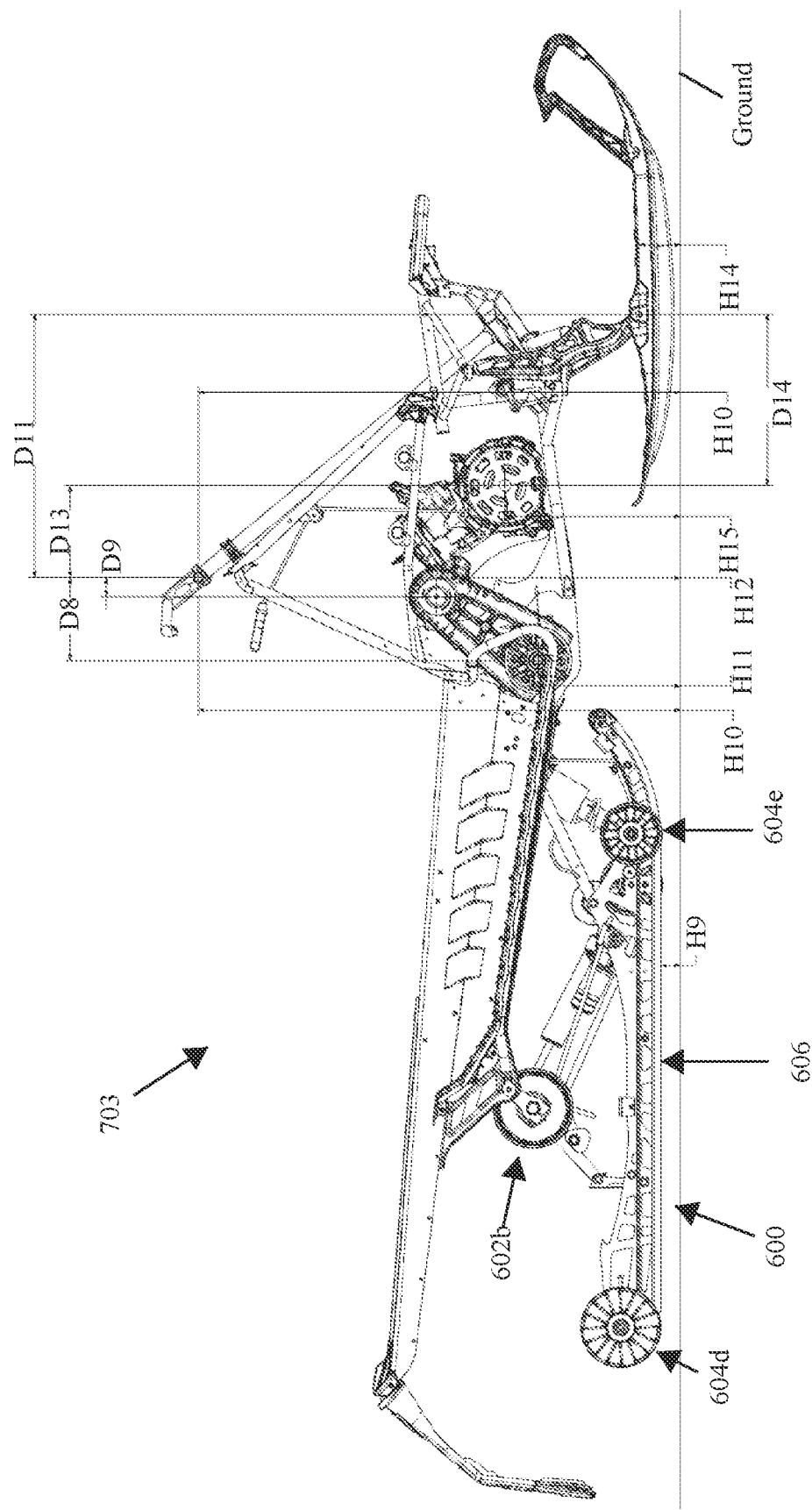
FIG. 15 is a side view of an embodiment of a snowmobile, according to some embodiments.

In one example, D9 is approximately 6-9% of D11, D8 is approximately 28-39% of D11, D10 is approximately 32-44% of D11, and D12 is approximately 58-79% of D11 (see e.g., FIG. 14). In another example, D9 is approximately 6-9% of D11, D8 is approximately 28-39% of D11, D13 is approximately 32-43% of D11, and D14 is approximately 59-80% of D11 (see e.g., FIG. 15).

The skid rail 606 is positioned above the ground at a distance H1, H9 of approximately 5-14% of H5, H8, H13, or H15. In one embodiment, H1 may be approximately 7-12% of the distance H5, H8. In another embodiment, H9 may be approximately 9-14% of the distance H13, H15.

Reference point 490 is positioned above the ground at a distance H2, H10 of approximately 225-341% of the distance H5, H8, H13 or H15. In one embodiment, H2 may be approximately 225-336% of the distance H5, H8, and optionally 265-290%. In another embodiment, H10 may be approximately 228-341% of the distance H13, H15, and optionally 260-285%.

The centerpoint 635 of a bottom drive sprocket 634 is positioned above the ground at a distance H3, H7, H11 of approximately 65-101% of the distance H5, H8, H13 or H15. H3 may be approximately 65-97% of the distance H5, and optionally 75-85%. H7 may be approximately 65-97% of the distance H8, and optionally 75-85%. H11 may be approximately 67-101% of the distance H13, and optionally 75-85%. In some embodiments, the lower control arm mount 112 may be positioned above the ground at a distance of 66-75% of the distance H3, H7, or H11.

The centerpoint 633 of a top drive sprocket 632 is positioned above the ground at a distance H4, H12 of approximately 113-172% of the distance H5, H8, H13 or H15. H4 may be approximately 130-145% of the distance H5, H8. H12 may be approximately 115-172% of the distance H13, H15.

The crankshaft axis of rotation 643 of the engine assembly 640 is positioned above the ground at a distance H5, H8, H13, H15.

The centerpoint 113 of the ski mount 110 is positioned above the ground at a distance H6, H14 of approximately 15-28% of the distance H5 H8, H13, H15. H6 may be approximately 15-20% of the distance H5. H14 may be approximately 20-28% of the distance H5.

Figure 13:
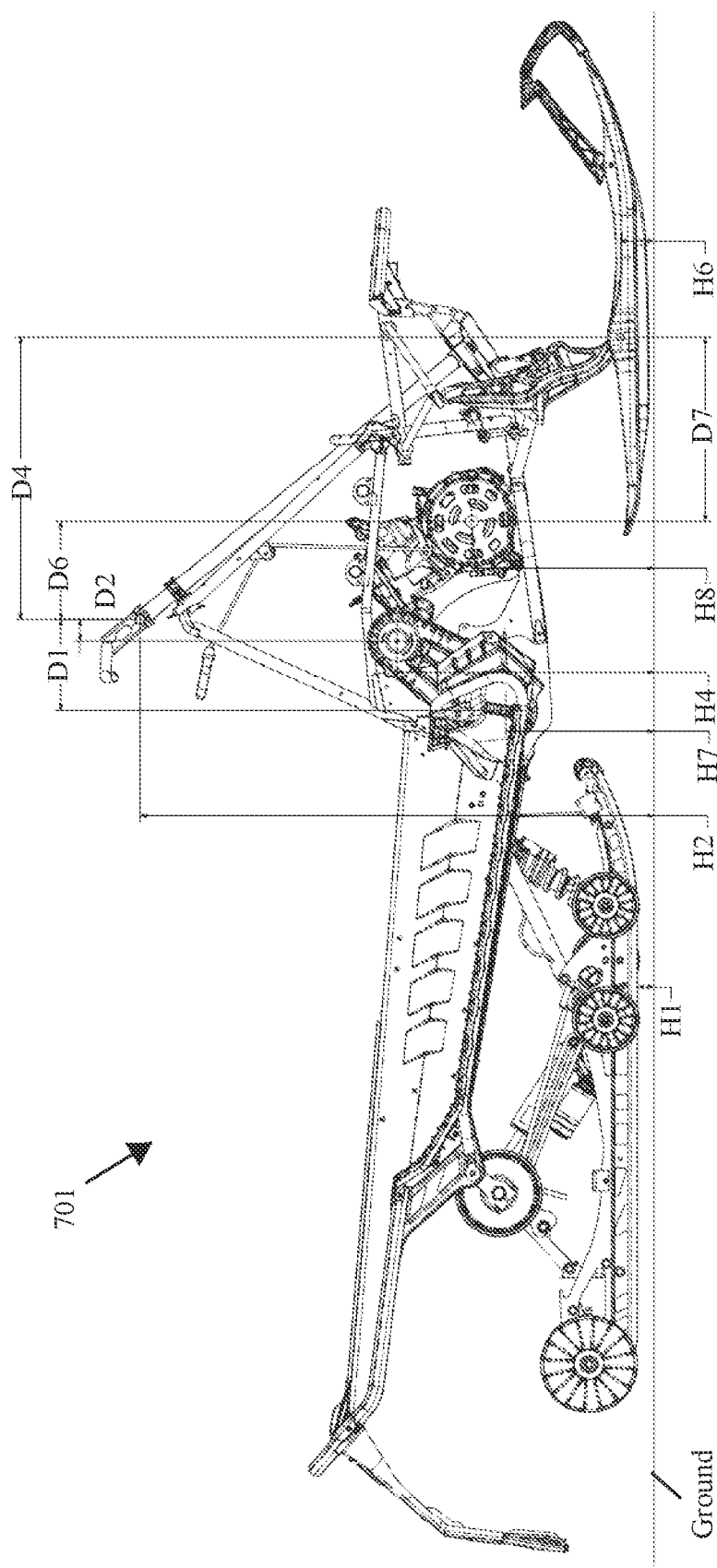
FIG. 13 is a side view of an embodiment of a snowmobile, according to some embodiments.

In at least one embodiment, D2<D1<D3, D6<D5, D7<D4 (see FIGS. 12-13). In at least one embodiment, D9<D8<D10, D13<D12, D14<D11 (see FIGS. 14-15). In at least one embodiment, H1<H6<H3, H7<H5, H8<H4<H2 (see e.g., FIGS. 12-13). In at least one embodiment, H9<H14<H11<H13, H15<H12<H10 (see e.g., FIGS. 14-15).

In one example, H1 is 5-10% of H5, optionally 8-10%; H2 is 265-285% of H5, optionally 270-280%; H3 is 75-85% of H5, optionally 80%; H4 is 135-145% of H5, optionally 140%; H6 is 15-20% of H5; D1 is 45-55% of H5, optionally 50%; D2 is 10-15% of H5; D3 is 45-55% of H5, optionally 50%; D4 is 140-160% of H5, optionally 150-160%; and D5 is 90-105% of H5, optionally 95-105%. (see e.g., FIG. 12).

In one example, H1 is 5-10% of H8, optionally 8-10%; H2 is 270-290% of H8, optionally 275-285%; H4 is 135-150% of H8, optionally 135-145%; H6 is 15-25% of H8, optionally 15-20%; H7 is 75-85% of H8, optionally, 80-85%; D1 is 45-55% of H8, optionally 50%, D2 is 8-15% of H8; D4 is 140-160% of H8, optionally 150-160%; D6 is 45-55% of H8, optionally 50-55%; and D7 is 95-105% of H8, optionally 100% (see e.g., FIG. 13).

In one example, H9 is 5-20% of H13, optionally 10-15%; H10 is 260-280% of H13, optionally 265-275%; H11 is 75-90% of H13, optionally 80-85%; H12 is 130-145% of H13, optionally 135-140%; H14 is 40-50% of H13, optionally 45%; D8 is 40-55% of H13, optionally, 45-50%; D9 is 5-15% of H13, optionally 10%; D10 is 45-60% of H13, optionally 50-55%; D11 is 140-155% of H13, optionally 145-150%; and D12 is 90-105% of H13, optionally 95-100% (see e.g., FIG. 14).

In one example, H9 is 5-20% of H15, optionally 8-15%; H10 is 260-285% of H15, optionally, 260-280%; H11 is 75-90% of H15, optionally, 75-85%; H12 is 130-150% of H15, optionally 130-145%; H14 is 15-30% of H15, optionally, 20-25%; D8 is 40-55% of H15, optionally 40-50%; D9 is 5-20% of H15, optionally 8-15%; D11 is 140-160% of H15, optionally 140-155%; D13 is 45-60% of H15, optionally 45-55%; and D14 is 90-110% of H15, optionally 95-105% (see e.g., FIG. 15).

In at least one embodiment, the centerpoint 113 of the ski mount 110 is positioned closer to the ground than the centerpoint 635 of the bottom drive sprocket 634; the centerpoint 635 of the bottom drive sprocket 634 is positioned closer to the ground than the crankshaft axis of rotation 643 of the engine assembly 640; the crankshaft axis of rotation 643 of the engine assembly 640 is positioned closer to the ground than the centerpoint 633 of the top drive sprocket 632; and the centerpoint 633 of the top drive sprocket 632 is positioned closer to the ground than reference point 490.

One benefit of the common forward frame assembly 440 is that front suspension 400, a belt housing assembly 630, and an engine assembly 640 utilized for different snowmobile embodiments may have different orientations, different sizes, and/or different positions. As noted above, one or more of the distances D1-D5 and/or H1-H6 may differ between snowmobile embodiments. For example, distance D3, D6 of the crankshaft axis of rotation 643 of the engine assembly 640 to reference point 490 may differ. As another example, distance H5, H8 of the crankshaft axis of rotation 643 of the engine assembly 640 to the ground may differ. A difference in one distance may also result in a difference in another distance, e.g., between the crankshaft axis of rotation 643 of the and the centerpoint 633 of the top drive sprocket 632, e.g., (D2+D3)>(D2+D6), or alternatively, (D2+D3)<(D2+D6).

Figure 16:
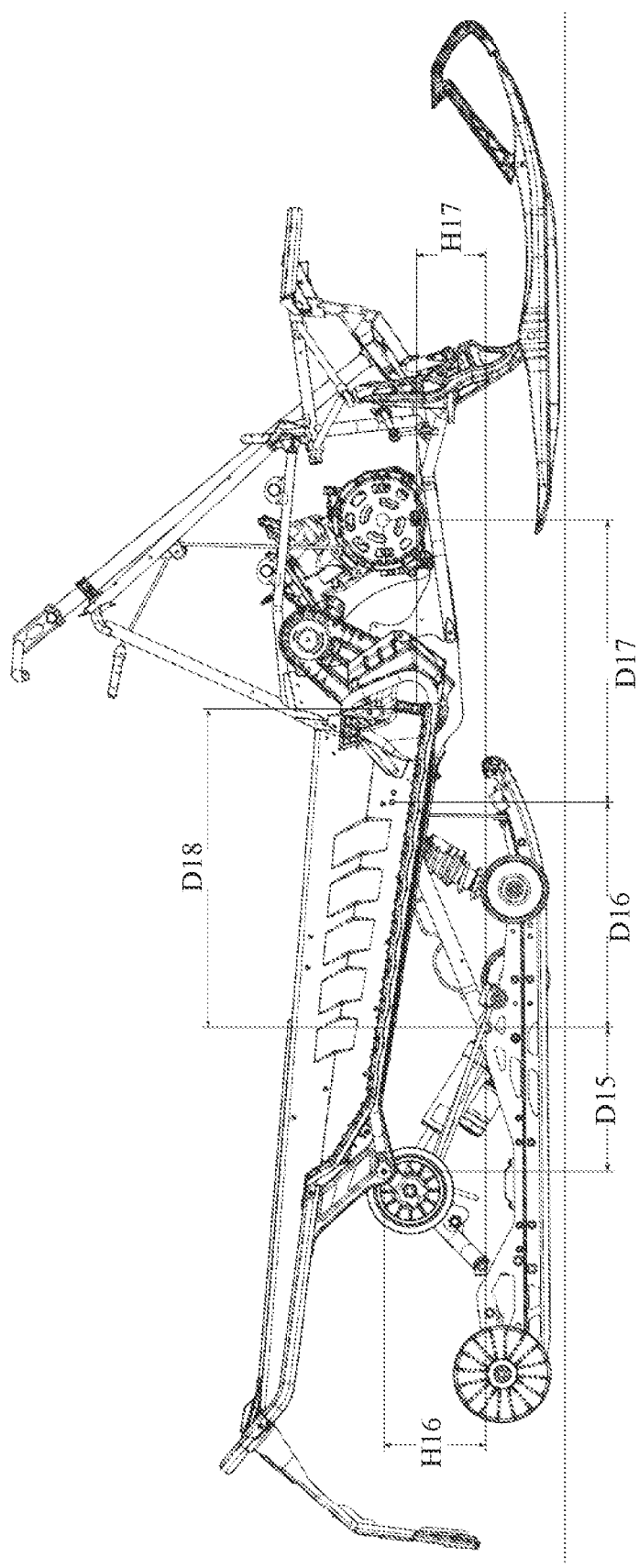
FIG. 16 is a side view of an embodiment of a snowmobile, according to some embodiments.

The distance between attachment point 618 and aperture 610 is represented by distance D15, which may be approximately 37-55% of the distance D18 (see e.g., FIG. 16). The distance between attachment point 618 and attachment point 616 is represented by distance D16, which may be approximately 58-87% of the distance D18. The distance between attachment point 616 and the crankshaft axis of rotation 643 of the engine assembly 640 is represented by distance D17, which may be approximately 72-108% of the distance D18. The distance between attachment point 616 and the centerpoint 635 of the bottom drive sprocket 634 is represented by distance D16+D17. The distance between attachment point 618 and the centerpoint 635 of the bottom drive sprocket 634 is represented by distance D18. The distance between attachment point 610 and attachment point 616 is represented by distance D15+D16. The distance between attachment point 610 and the crankshaft axis of rotation 643 of the engine assembly 640 is represented by distance D15+D16+D17. The height differential between attachment point 618 and aperture 610 is represented by distance H16, which may be approximately 26-39% of the distance D18. The height differential between attachment point 618 and the centerpoint 635 of the bottom drive sprocket 634 is represented by distance H17, which may be approximately 17-27% of the distance D18. The height differential between attachment point 610 and the centerpoint 635 of the bottom drive sprocket 634 is represented by the difference between distances H16 and H17.

In at least one embodiment, D15<D16<D17<D18 and/or H17<H16 (see e.g., FIG. 16). In some embodiments, H16 is 25-40% of D18, optionally 30-40%; H17 is 15-30% of D18, optionally 20-30%; D15 is 40-55% of D18, optionally 45-50%; D16 is 65-80% of D18, optionally 70-75%, and D17 is 85-95% of D18, optionally 90%.

In an embodiment, the percentage of a length (D18+D8) from 618 to 490 with respect to a total length (D18+D8+D11) from 618 to 113 is at least 55%, is optionally 56% to 64%, and optionally 57% to 63%, and optionally 57% to 61%.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

Various examples have been described. These and other examples are within the scope of the following claims.

What is claimed is:

1. A spindle, comprising:
an upper control arm mount;
a lower control arm mount, wherein a steering axis is defined through the upper control arm mount and the lower control arm mount;
a base, the base including a ski mount, the ski mount including a hole defining an axis X; and
a spindle body including a spine, a front fin extending from a front surface of the spine, and a rear fin extending from a back surface of the spine,
wherein the steering axis is disposed forward of the axis X of the ski mount,
wherein between 80% to 90% of the spindle body is positioned behind the steering axis.

2. The spindle of claim 1, wherein the spine has two curvilinear edges.

3. The spindle of claim 1, wherein the spindle body further comprises a rear mount, wherein the rear mount has a vertical position that is between the upper control arm mount and the base.

4. The spindle of claim 1, wherein a majority of the spindle body is positioned behind the steering axis.

5. The spindle of claim 1, wherein the hole of the ski mount is disposed entirely rearward of the steering axis 4.

6. The spindle of claim 1, wherein the spindle body includes a curvilinear outboard edge, a curvilinear inboard edge, a curvilinear leading edge, and a curvilinear trailing edge.

7. The spindle of claim 1, wherein the upper control arm mount includes a through-hole with a threaded section for receiving a threaded fastener.

8. The spindle of claim 1, wherein the front fin and the rear fin include a plurality of windows.

9. A spindle, comprising:
a top mount that is operably securable to a suspension component;
a base including a bottom mount that is operably securable to a ski;
a spindle body, the spindle body including:
a curvilinear spine extending from the base to the top mount; and
a rear fin extending from a back surface of the curvilinear spine, wherein the rear fin is positioned substantially orthogonal to the spine at one or both of a first position that is adjacent to the top mount and a second position that is adjacent to the base.

10. The spindle of claim 9, wherein the spindle body includes a front fin extending from a front surface of the curvilinear spine, wherein the front fin is positioned orthogonal to the spine at the first position that is adjacent to the top mount.

11. The spindle of claim 9, wherein the spindle body further comprises a front mount, wherein a front fin comprises a concave upper portion that extends between the front mount and the top mount and a concave lower portion that extends between the front mount and the base.

12. The spindle of claim 11, wherein the rear fin includes a first portion, a second portion extending inboard from the first portion to the top mount, and a third portion extending inboard from the first portion to the base, wherein a steering axis extends through the top mount and the front mount, and wherein the first portion of the rear fin is positioned entirely outboard of the steering axis.

13. The spindle of claim 9, wherein the spindle has a steering axis that extends through the top mount and a front mount, wherein at most 10% of the spindle body is located in front of the steering axis and wherein the spindle body is generally shaped as a plus sign (+) near the top mount and generally shaped as a T near the bottom mount.

14. A snowmobile, comprising:
a frame;
a ski;
an engine;
a spindle connecting the frame to the ski, the spindle including a lower control arm mount and a spindle body, the lower control arm mount having a first height relative to a ground plane, the spindle securing the frame to the ski; and
a track drive coupled to the engine, the track drive including a bottom track drive sprocket, the bottom track drive sprocket defining a track drive axis, the track drive axis having a second height relative to the ground plane,
wherein the first height is between 66% to 75% of the second height.

15. The snowmobile of claim 14, wherein the frame includes a forward frame member including a first end, and a second end extending upwardly and rearwardly to a steering column mount.

16. The snowmobile of claim 15, further comprising a steering column having a length extending with a first end positioned adjacent the steering column mount and a second end operably connected to the frame along a longitudinal centerline of the forward frame member, wherein the steering column extends entirely over the top of the spindle when viewed from the side of the forward frame member.

17. The snowmobile of claim 16, wherein the lower control arm mount includes a forward mount on the frame, and the second end of the steering column is positioned forward of the forward mount along the longitudinal centerline of the forward frame member.

18. The snowmobile of claim 17, wherein the second end of the steering column is positioned lower than the top of the spindle.

19. The snowmobile of claim 14, wherein the spindle includes an upper control arm mount and a steering axis defined through the upper control arm mount and the lower control arm mount, wherein between 80% to 90% of the spindle body is positioned behind the steering axis.

20. The snowmobile of claim 19, wherein the spindle body includes a curvilinear outboard edge, a curvilinear inboard edge, a curvilinear leading edge, and a curvilinear trailing edge.

21. A spindle comprising:
an upper control arm mount;
a lower control arm mount;
a base comprising a ski mount; and
a body extending between the base and the upper control arm mount, the body comprising a double curve defining a first forward facing concavity positioned along the body between the upper control arm mount and the lower control arm mount, a second forward facing concavity positioned along the body between the lower control arm mount and the base, and a rearward facing concavity positioned along the body between the first forward facing concavity and the second forward facing concavity,
wherein the lower control arm mount extends forward and inboard from the body.

22. The spindle of claim 21, wherein a steering axis extends through the upper control arm mount and the lower control arm mount, wherein the body includes an inboard side and an outboard side, wherein the body includes a first portion, a second portion extending inboard from the first portion to the upper control arm mount, and a third portion extending inboard from the first portion to the base, and wherein the inboard side of the first portion is at least partially positioned outboard of the steering axis.

23. The spindle of claim 21, wherein the spindle includes a fin comprising a trailing edge positioned along an outboard side of the body, and a leading edge extending forward and inboard from the outboard side of the body to the lower control arm mount.

\* \* \* \* \*